(12) United States Patent
Suzuki et al.

(10) Patent No.: US 7,529,455 B2
(45) Date of Patent: May 5, 2009

(54) OPTICAL INTEGRATED DEVICE AND OPTICAL CONTROL DEVICE

(75) Inventors: Shuichi Suzuki, Kanagawa (JP); Atsushi Sakai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 11/501,050

(22) Filed: Aug. 9, 2006

(65) Prior Publication Data

US 2007/0036500 A1 Feb. 15, 2007

(30) Foreign Application Priority Data

Aug. 11, 2005 (JP) ............................. 2005-233491
Apr. 26, 2006 (JP) ............................. 2006-122176

(51) Int. Cl.
*G02B 6/10* (2006.01)
*G02B 6/255* (2006.01)

(52) U.S. Cl. ..................................... 385/129; 385/95

(58) Field of Classification Search ............... 385/129
See application file for complete search history.

(56) References Cited

U.S. PATENT DOCUMENTS

| | | | | |
|---|---|---|---|---|
| 5,129,020 A | * | 7/1992 | Shigematsu et al. | ............. 385/43 |
| 5,732,170 A | * | 3/1998 | Okude et al. | ................. 385/27 |
| 6,449,400 B1 | * | 9/2002 | Watanabe et al. | ............. 385/12 |
| 6,907,152 B2 | * | 6/2005 | Takahashi et al. | ............. 385/15 |
| 2004/0057667 A1 | * | 3/2004 | Yamada et al. | ................ 385/43 |
| 2006/0050752 A1 | * | 3/2006 | Nunoya et al. | ........... 372/43.01 |

FOREIGN PATENT DOCUMENTS

| | | |
|---|---|---|
| JP | 2002-122750 | 4/2002 |
| JP | 2004-070015 | 3/2004 |
| JP | 2004-184986 | 7/2004 |
| JP | 2004-334190 | 11/2004 |
| JP | 2006-126518 | 5/2006 |

OTHER PUBLICATIONS

Lee, K. et al., "Effect of Size and Roughness on Light Transmission in a Si/SiO2 Waveguide: Experiments and Model," Appl. Phys. Lett. 77, No. 11, pp. 1617-1619 (Sep. 2000).
Sakai, A. et al., "Low Loss Ultra-Small Branches in a Silicon Photonic Wire Waveguide," IEICE Trans. Electron., vol. E85-C, No. 4, pp. 1033-1038.
Kokubun, Y., "Photonic Wavelength Router Using Microring Resonator," Oyo Buturi, vol. 72, No. 11, pp. 1369-1373 (2003).

* cited by examiner

*Primary Examiner*—Michelle R. Connelly-Cushwa
*Assistant Examiner*—Chris Chu
(74) *Attorney, Agent, or Firm*—Dickstein Shapiro LLP

(57) ABSTRACT

An optical integrated device having multiple optical waveguides connected on the same substrate and each including a core and a cladding is disclosed. Adjacent two of the optical waveguides are different in the refractive index difference between the core and the cladding.

13 Claims, 31 Drawing Sheets

FIG.33A
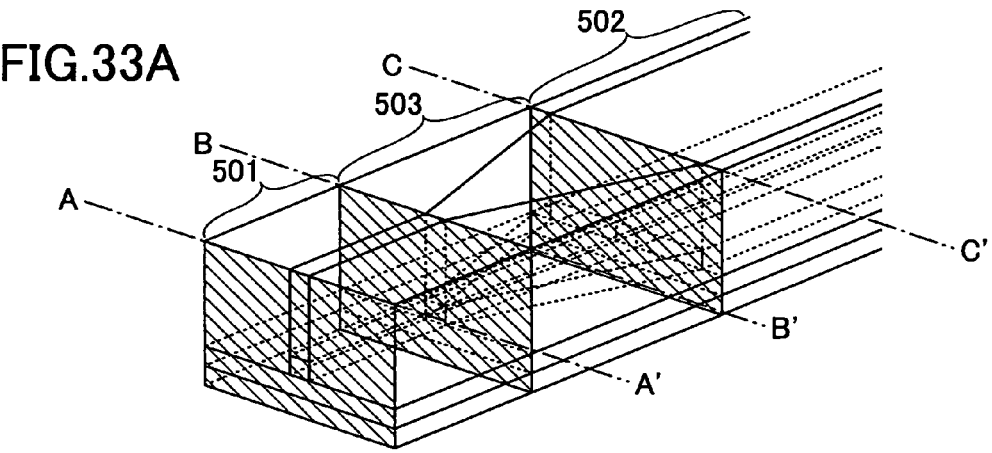
FIG.33B
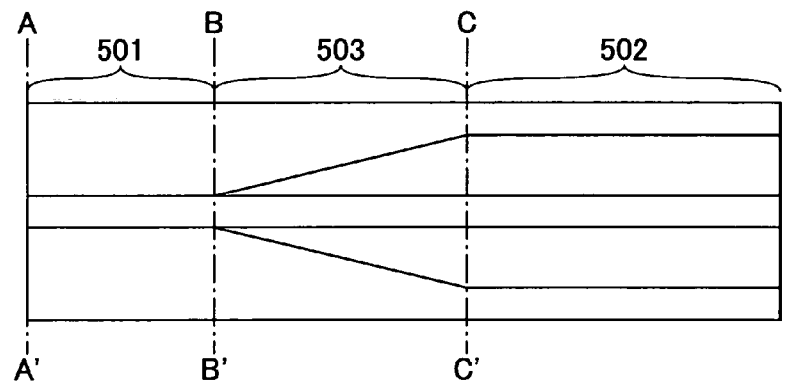
FIG.33C
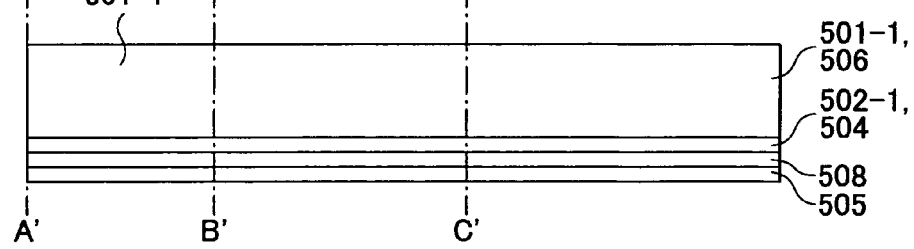
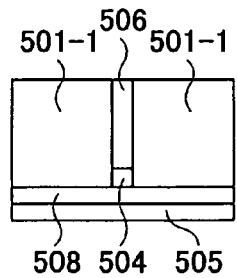
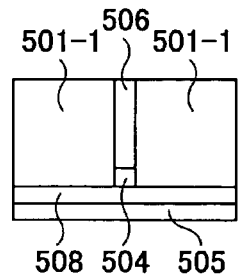
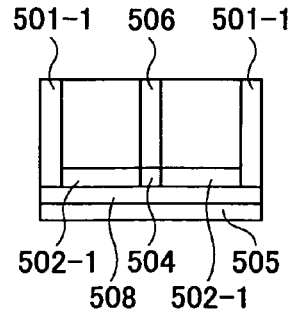
FIG.33D  FIG.33E  FIG.33F

OPTICAL INTEGRATED DEVICE AND OPTICAL CONTROL DEVICE

BACKGROUND OF THE INVENTION

1. Field of the Invention

The present invention relates generally to optical integrated devices and optical control devices, and more particularly to an optical integrated device having optical waveguides different in refractive index difference coupled to each other, and to an optical control device using the same. Examples of the optical control device include an optical delay device, an optical switching device, an optical routing device, an optical information processor, a light emitting device, a light receiving device, and a non-linear optical device.

2. Description of the Related Art

Optical integrated circuits employing a planar lightwave circuit (PLC) as a basic interconnection element are capable of advanced optical signal control, and are principal components in optical communications. Many of the optical circuits employed in these optical integrated circuits have a waveguide structure confining light in a core using total reflection due to the difference in refractive index between the core and a cladding. Planar waveguides are interconnection members for optical control devices, and conventionally, those formed of a silica-based material have been employed. The core-cladding relative index difference is small in the silica-based waveguide. Therefore, the silica-based waveguide has a large cross section size of 5 to 10 µm in order to satisfy single mode conditions, and has a large radius of curvature of 1 to 25 mm in the case of bending a waveguide and changing the propagation direction. As a result, the silica-based waveguide is large in device size, and therefore, is not suitable for high integration.

On the other hand, studies have been made of a fine optical control device that employs as the core of an optical waveguide a material having an extremely high refractive index compared with the conventional silica-based materials. For example, by employing a semiconductor material having a refractive index of 3 or higher or a glass material having a refractive index of approximately 2 as a core, and employing air as a cladding, it is possible to achieve a relative index difference of approximately 40% or higher. This makes it possible to achieve significant miniaturization in device size compared with common silica-based PLC devices. Specifically, the bend radius that enables lossless propagation is a few µm, which is less than or equal to approximately one-thousandth of that of the conventional silica-based waveguide. The optical waveguide that has an extremely high relative index difference compared with the conventional total reflection optical waveguide, specifically a relative index difference of 10% or higher, is referred to as "high index contrast (HIC) optical waveguide."

Various optical control devices have been proposed using such HIC waveguides. As an example of employing silicon as a core material, an ultra-small optical branch device is proposed in [Non-Patent Document 1], and a wavelength filter using a Bragg grating is proposed in [Patent Document 1]. In addition, there is also proposed an optical control device using a photonic crystal waveguide formed of a high refractive index material. The photonic crystal forms a photonic band gap, or a forbidden band of photons, with a periodic structure of about a wavelength of light, and shows a peculiar effect because of strong dispersiveness. In these respects, the photonic crystal is counted on as a micro optical integrated circuit or a new function optical device. For example, a minute path change device and a switching device that performs switching by performing refractive index modulation on a device material are proposed.

By thus forming an optical waveguide of materials between which there is a great difference in refractive index, it is possible to make individual optical devices extremely minute in size. As a result, a future large-scale optical integrated circuit can be expected to have a compact configuration.

However, although a total reflection linear waveguide can perform lossless light propagation in principle, propagation loss is inevitably caused by light scattering due to the roughness of the side faces of the waveguide (core) generated at the time of its fabrication. As the relative index difference of an optical waveguide is greater, the effect of the relative index difference is more conspicuous in the propagation loss. In general, the propagation loss in a linear optical waveguide is proportional to a relative index difference to the $2.5^{th}$ power. Accordingly, there is a problem in that in the case of configuring an optical integrated circuit formed of multiple optical control devices of an optical waveguide type using only HIC optical waveguides, or in the case of including a linear portion in the device structure, the insertion loss of the entire integrated circuit is extremely great.

Therefore, in order to solve this problem, a waveguide of low refractive index difference and a waveguide of high refractive index difference are stacked in layers different in a vertical direction in [Non-Patent Document 2]. The low index difference waveguide is in charge of signal interconnection, and at the time of performing control such as path changing on a light signal, the light is transferred to the layer formed of the high index difference waveguide including a curved waveguide, where optical control is performed in an extremely minute region.

[Non-Patent Document 1] Sakai, A. et al., "Low Loss Ultra-Small Branches in a Silicon Photonic Wire Waveguide," IEICE Trans. Electron., Vol. E85-C, No. 4, pp. 1033-1038

[Non-Patent Document 2] Kokubun, Y., "Photonic Wavelength Router Using Microring Resonator," Oyo Buturi, Vol. 72, No. 11, pp. 1369-1373 (2003)

[Patent Document 1] Japanese Laid-Open Patent Application No. 2004-070015

However, in realizing such a layered optical waveguide device, there is a problem in that the fabrication process is complicated and that it is very difficult align an optical interconnection and an optical control part.

SUMMARY OF THE INVENTION

Embodiments of the present invention may solve or reduce one or more of the above problems.

According to one embodiment of the present invention, there is provided an optical integrated device and an optical control device in which one or more of the above problems are solved.

According to one embodiment of the present invention, a high-density, low-loss optical integrated device and optical control device are provided by providing a low index difference waveguide and a high index difference waveguide on the same substrate and connecting the waveguides at an optical coupling part.

According to one embodiment of the present invention, there is provided an optical integrated device having multiple optical waveguides connected on the same substrate and each including a core and a cladding, wherein adjacent two of the optical waveguides are different in a refractive index difference between the core and the cladding.

Accordingly, it is possible to provide an easily fabricable, low-loss optical integrated device in which optical waveguides disposed on the same substrate are integrated with high density.

According to one embodiment of the present invention, there is provided an optical integrated device having multiple optical waveguides connected on the same substrate and each including a core and a cladding, wherein: a first one of adjacent three of the optical waveguides and a second one of the adjacent three of the optical waveguides are equal in the refractive index difference between the core and the cladding; and a third one of the adjacent three of the optical waveguides sandwiched between the first one and the second one thereof is different in the refractive index difference between the core and the cladding from the first one and the second one.

Accordingly, it is possible to provide an easily fabricable, low-loss optical integrated device in which optical waveguides disposed on the same substrate are integrated with high density.

According to one embodiment of the present invention, there is provided an optical integrated device having multiple optical waveguides connected on the same substrate and each including a core and a cladding, the optical integrated device including an optical coupling part configured to couple adjacent two of the optical waveguides different in the refractive index difference between the core and the cladding, the optical coupling part including an optical waveguide having a core and a cladding.

Accordingly, it is possible to provide an optical integrated device that couples optical waveguides having different relative index differences with low loss and includes an easily fabricable optical coupling part.

BRIEF DESCRIPTION OF THE DRAWINGS

Other objects, features and advantages of the present invention will become more apparent from the following detailed description when read in conjunction with the accompanying drawings, in which:

FIGS. 33A through 33F are diagrams showing an optical integrated device according a 15$^{th}$ embodiment of the present invention;

DETAILED DESCRIPTION OF THE PREFERRED EMBODIMENTS

A description is given below, with reference to the accompanying drawings, of embodiments of the present invention.

Figure 1:
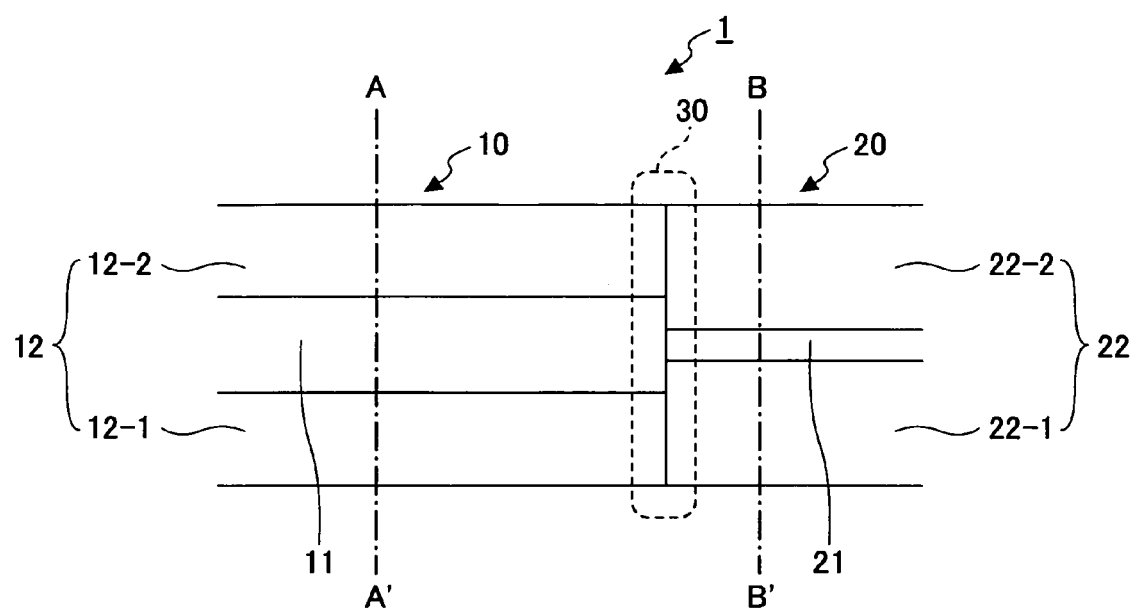
FIG. 1 is a sectional view of an optical integrated device according to a first embodiment of the present invention.

FIG. 1 is a sectional view of an optical integrated device 1 according to a first embodiment of the present invention. Referring to FIG. 1, the optical integrated device 1 includes an optical waveguide 10 and an optical waveguide 20 that propagate light. The optical waveguides 10 and 20 are formed and coupled to each other on the same substrate. The optical waveguide 10 includes a core 11 and a cladding 12. The core 11 is higher in refractive index than the cladding 12, thereby confining light in the core 11 using total reflection and propagating light. Further, the optical waveguide 20 includes a core 21 and a cladding 22. Light propagates in the core 21 in the optical waveguide 20 the same as in the optical waveguide 10. The optical integrated device 1 has an optical coupling part 30 at which the optical waveguide 10 and the optical waveguide 20 are coupled in series. The light that propagates in the optical waveguide 10 is coupled to the optical waveguide 20 through the optical coupling part 30 so as to propagate in the optical waveguide 20.

Referring to FIG. 1, the optical waveguide 10 and the optical waveguide 20 are different from each other in relative index difference. According to this embodiment, the optical waveguide 20 is greater in relative index difference than the optical waveguide 10. Hereinafter, a waveguide whose refractive index difference is relatively small as the optical waveguide 10 is referred to as "low index difference waveguide," and a waveguide whose refractive index difference is relatively large as the optical waveguide 20 is referred to as "high index difference waveguide." The relative index difference is an index indicating the difference in refractive index between core and cladding in the optical waveguide. Letting the refractive index of a core be $n_1$ and letting the refractive index of a cladding be $n_2$, the relative index difference $\Delta$ is defined by:

$$\Delta = (n_1^2 - n_2^2)/(2n_1^2).$$

The value of $\Delta$ is about several % in a typical optical waveguide forming a PLC. It is possible to confine light in the optical waveguide more strongly with a greater refractive index difference. Accordingly, it is possible to reduce a radius of curvature in the case of forming an optical interconnection with an optical waveguide with curvature, so that it is possible to integrate optical interconnections with high density. Further, since light is strongly confined in the waveguide, it can be expected that the non-linear effect increases to increase the efficiency of a wavelength conversion device. In principle, a linear waveguide that confines light with total reflection propagates light without loss. Actually, however, propagation loss occurs because of the sidewall roughness of the core of the waveguide generated in the fabrication process. The effect of this is conspicuous with a greater refractive index difference. Accordingly, in the case of propagating light in a straight line or a curve having a large radius of curvature, reduction in the refractive index difference reduces excessive loss in an optical device. Therefore, according to this embodiment, it is possible to realize a high-density optical integrated device with low loss by integrating a high index difference waveguide and a low index difference waveguide on the same substrate.

Figure 2A:
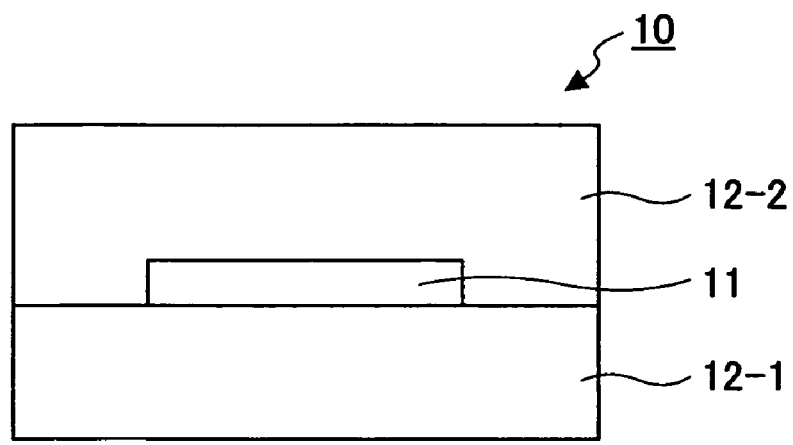
FIG. 2A is a cross-sectional view of the optical integrated device of FIG. 1 taken along the line A-A'.
Figure 2B:
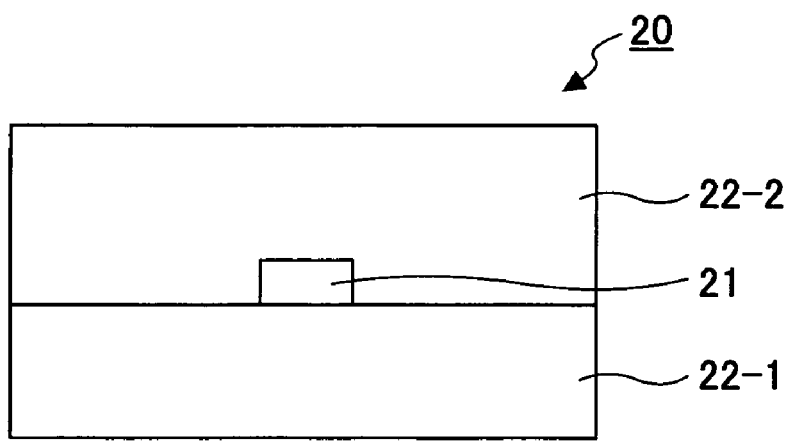
FIG. 2B is a cross-sectional view of the optical integrated device of FIG. 1 taken along the line B-B' according to the first embodiment of the present invention.

There is a simple method of integrating optical waveguides different in relative index difference, according to which the same core material is used but different cladding materials are used in the two types of waveguides. A description is given below of this integration structure. FIG. 2A is a cross-sectional view of the optical integrated device 1 of FIG. 1 taken along the line A-A'. As shown in FIG. 2A, the optical waveguide 10, which is a low index difference waveguide, includes the core 11 and the cladding 12, which has a lower cladding 12-1 and an upper cladding 12-2. Further, FIG. 2B is a cross-sectional view of the optical integrated device 1 of FIG. 1 taken along the line B-B'. As shown in FIG. 2B, the optical waveguide 20, which is a high index difference waveguide, includes the core 21 and the cladding 22, which has a lower cladding 22-1 and an upper cladding 22-2. Here, in the two types of waveguides 10 and 20, the same material is used for the core 11 and the core 21, and the same material is used for the lower cladding 12-1 and the lower cladding 22-1. Further, comparing the upper cladding 12-2 and the upper cladding 22-2, the material of the upper cladding 12-2 is higher in refractive index than the material of the upper cladding 22-2. Thereby, it is possible to realize waveguides having different relative index differences on the same substrate. Further, for further simplification, it is desirable that the core 11 and the core 21 have the same thickness. Examples of the material of the upper cladding 22-2 of the optical waveguide 20, which is a high index difference waveguide, include air having a refractive index of 1.0.

Further, the greater the refractive index difference, the smaller the core of a single-mode optical waveguide becomes in size. That is, in the optical waveguides 10 and 20 having different relative index differences, if the optical waveguides 10 and 20 are equal in core thickness, the waveguide width of the optical waveguide 10, which is a low index difference waveguide, is greater than the waveguide width of the optical waveguide 20, which is a high index difference waveguide. The magnetic field distribution of light that propagates in the optical waveguide 10, which is a low index difference waveguide, and the magnetic field distribution of light that propagates in the optical waveguide 20, which is a high index difference waveguide, are different from each other. Therefore, optical loss is caused in the case of connecting the waveguides 10 and 20 by butt connecting. Therefore, according to this embodiment, the suitable optical coupling part 30 is provided between the optical waveguides 10 and 20 having different relative index differences, thereby enabling low-loss coupling between the waveguides 10 and 20 having different relative index differences.

Figure 3:
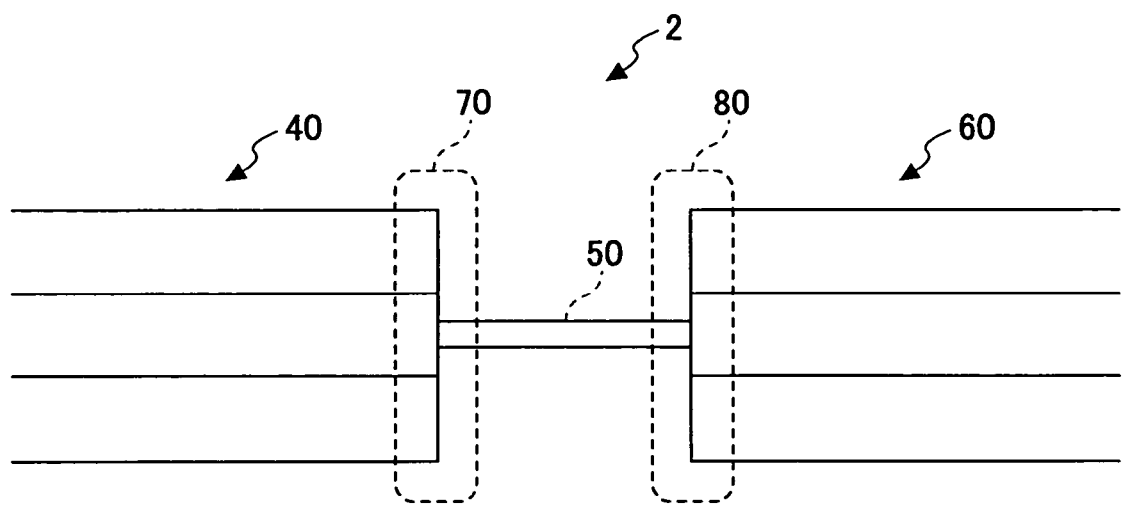
FIG. 3 is a sectional view of an optical integrated device according to a second embodiment of the present invention.

FIG. 3 is a sectional view of an optical integrated device 2 according to a second embodiment of the present invention. The optical integrated device 2 of this embodiment shown in FIG. 3 has a configuration where three types of waveguides are integrated. Referring to FIG. 3, optical waveguides 40, 50, and 60 are connected in order in series. The optical waveguides 40 and 50 are coupled by an optical coupling part 70, and the optical waveguides 50 and 60 are coupled by an optical coupling part 80. Here, the optical waveguide 40 and the optical waveguide 60 have the same relative index difference, which is different from the relative index difference of the optical waveguide 50. According to this embodiment, the optical waveguide 50 is a high index difference waveguide, and the optical waveguides 40 and 60 are low index difference waveguides. Alternatively, however, the optical waveguide 50 may be a low index difference waveguide, and the optical waveguides 40 and 60 may be high index difference waveguides.

By combining a high index difference waveguide with a conventional optical integrated device that propagates guided light with a low index difference waveguide as shown in FIG. 3, it is possible to easily fabricate a composite waveguide and realize an optical integrated device that is reduced in size. This is because compact integration of the high index difference waveguide is easy because of its small single-mode mode diameter and high NA characteristic dependent on its high refractive index difference. Further, although not graphically illustrated, in the case of connecting a low index difference waveguide between two high index difference waveguides of a conventional optical integrated device that propagates light with high index difference waveguides, the low index difference waveguide can increase a spatial propagation region and achieve low loss because of its large single-mode mode diameter dependent on its low refractive index difference. Thus, it is possible to realize a more sophisticated optical integrated device.

Figure 4:
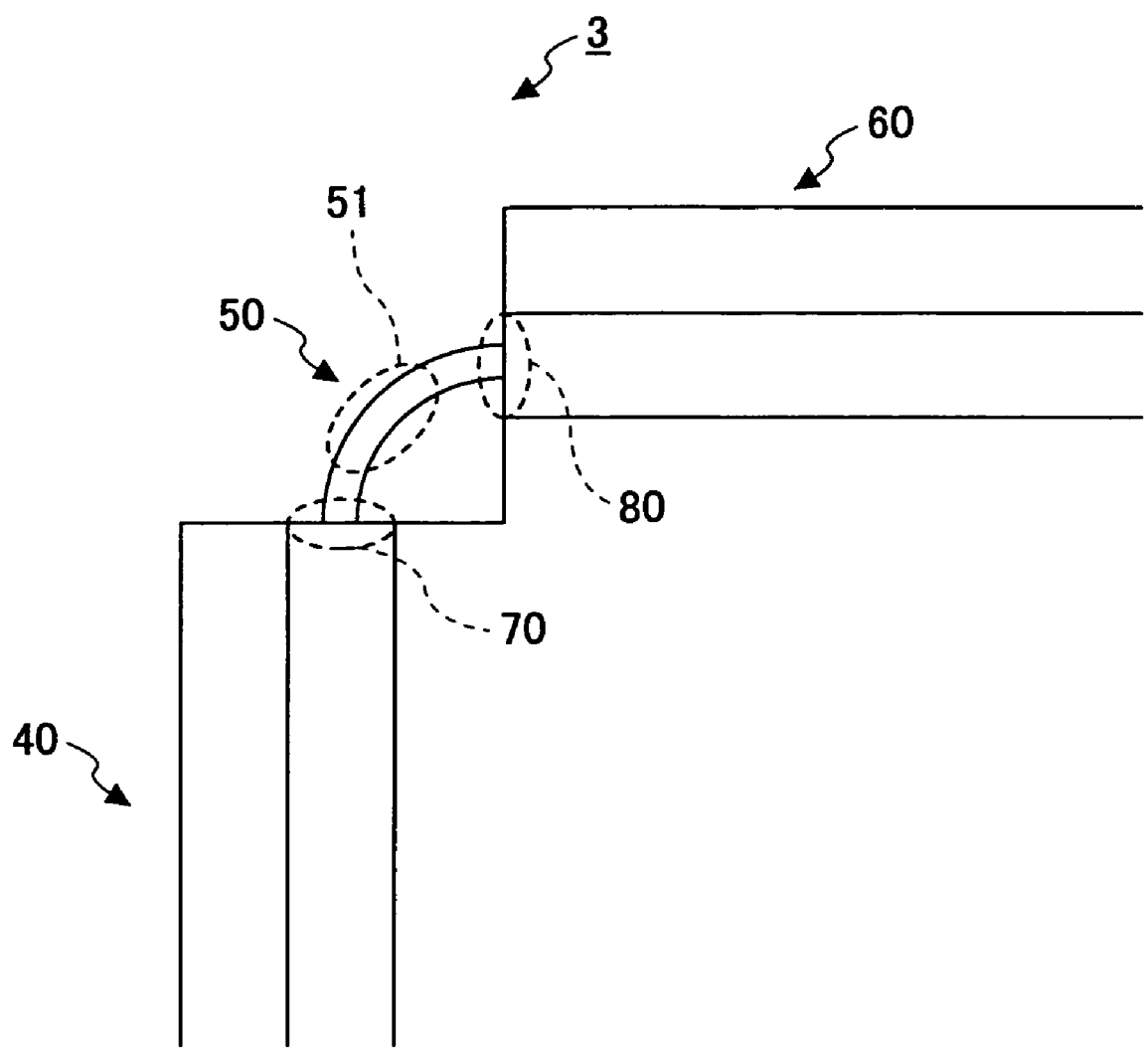
FIG. 4 is a sectional view of an optical integrated device according to a third embodiment of the present invention.

FIG. 4 is a sectional view of an optical integrated device 3 according to a third embodiment of the present invention. In FIG. 4, the same elements as those of FIG. 3 are referred to by the same reference numerals. The optical integrated device 3 integrates three types of waveguides. In the optical integrated device 3, the optical waveguide 50 is a high index difference waveguide, and the optical waveguides 40 and 60 are low index difference waveguides. Further, the optical waveguide 50 includes a curved part 51 as shown in FIG. 4. Since the optical waveguide 50 is strong in light confinement, it is possible to reduce a radius of curvature at the curved part 51. As a result, the direction of light propagation in the low index difference waveguide can be changed in an extremely minute region. In the case of FIG. 4, the optical waveguide 40 and the optical waveguide 60, which are low index difference waveguides, are linear waveguides. Alternatively, the same effect can be produced by providing the optical waveguides 40 and 60 with a larger radius of curvature and providing the optical waveguide 50, which is a high index difference waveguide, with a smaller radius of curvature.

The curvature of the curved part 51 of the optical waveguide 50 of FIG. 4, which is a high index difference waveguide, is not limited to the curvature corresponding to 90 degrees shown in FIG. 4. The same effect as described above is produced with any curvature greater than 0 degrees and less than 180 degrees. Further, it is also effective to provide the optical waveguide 50, which is a high index difference waveguide, with a curved part having a curvature corresponding to 30 degrees or 45 degrees if each of the optical waveguide 40 and the optical waveguide 60, which are low index difference waveguides, has a curved part having a curvature corresponding to 10 degrees with respect to a specific waveguide length. More specifically, it is preferable to provide a small curvature that is greater than or equal to the ratio of the refractive index difference of the optical waveguides 40 and 60, which are low index difference waveguides, to the refractive index difference of the optical waveguide 50, which is a high index difference waveguide. Further, it is not necessary for the curvature of the optical waveguide 50, which is a high index difference waveguide, to be a constant value. It is also effective to have multiple curvatures or a gradually changing curvature.

Figure 5:
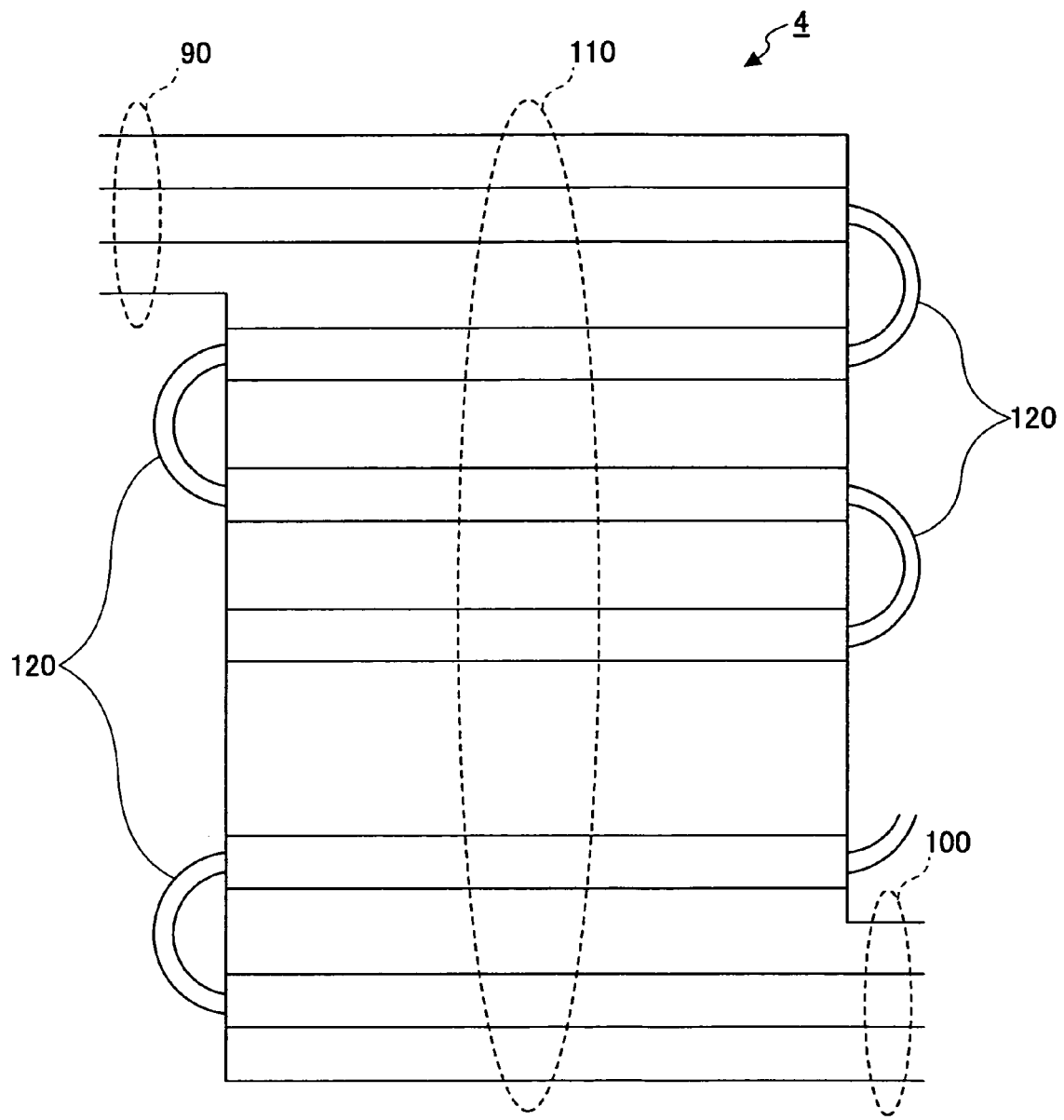
FIG. 5 is a sectional view of an optical control device according to a fourth embodiment of the present invention.

FIG. 5 is a sectional view of an optical control device 4 according to a fourth embodiment of the present invention. The optical control device 4 of this embodiment shown in FIG. 5 has a configuration where multiple low index difference linear waveguides disposed parallel to one another are coupled through high index difference waveguides. The optical control device 4 of this embodiment can be used to provide an optical pulse signal with group delay using propagation time in multiple linear waveguides. A linear waveguide group 110 is interposed between an optical input part 90 and an optical output part 100. The linear waveguide group 110 has the function of providing light with group delay. Specifically, if the group index of an optical waveguide is 3.0, it is possible to provide light with a signal delay of 1 ns by propagating the light for 10 cm in its linear waveguide. To realize light propagation of 10 cm only with a linear waveguide requires too large a device length, thus making it difficult to realize an optical control device of high-density integration. Therefore, more realistically, it may be considered to couple optical waveguides of several mm to 1 cm in length through curved waveguides so that the total propagation distance is approximately 10 cm. However, the conventional common optical waveguide has a relative index difference of approximately 1%, and in the case of realizing a curved waveguide using the conventional optical waveguide, a radius of curvature is required to be on the order of a millimeter in order that the radiation loss of light in the curved waveguide is so low as to be ignorable. Therefore, it is not possible to integrate linear waveguides with high density, thus causing an increase in device size.

Therefore, in the optical control element 4 of this embodiment, the linear waveguide group 110 is formed of multiple low index difference linear waveguides, and curved waveguides 120 each coupling corresponding two of the linear waveguides are formed of high index difference waveguides. By using high index difference waveguides for the curved waveguides 120, it is possible to make minute the radius of curvature of each curved or bent part. Therefore, it is possible to reduce the distance between each set of adjacent linear waveguides. More specifically, by causing the relative index difference to be approximately 40% or higher, the radius of curvature of each curved waveguide 120 is several microns, so that it is possible to realize a curve without radiation loss. That is, the device size can be smaller than conventionally by 5 digits or more, and at the same time, low loss can be achieved.

Further, the optical control device 4 of this embodiment shown in FIG. 5 is not limited in configuration to parallel arrangement of multiple low index difference waveguides. The same effects can also be produced by any arrangement that can increase a waveguide distance per area, such as a zigzag arrangement having a triangle wave-like shape or a polygonally spiral arrangement. Further, in the case of the parallel arrangement, it is not necessary for the waveguides to be completely parallel to one another. Further, the fact that the linear waveguides have a larger radius of curvature than the high index difference waveguides alone can produce the same effects.

Figure 6:
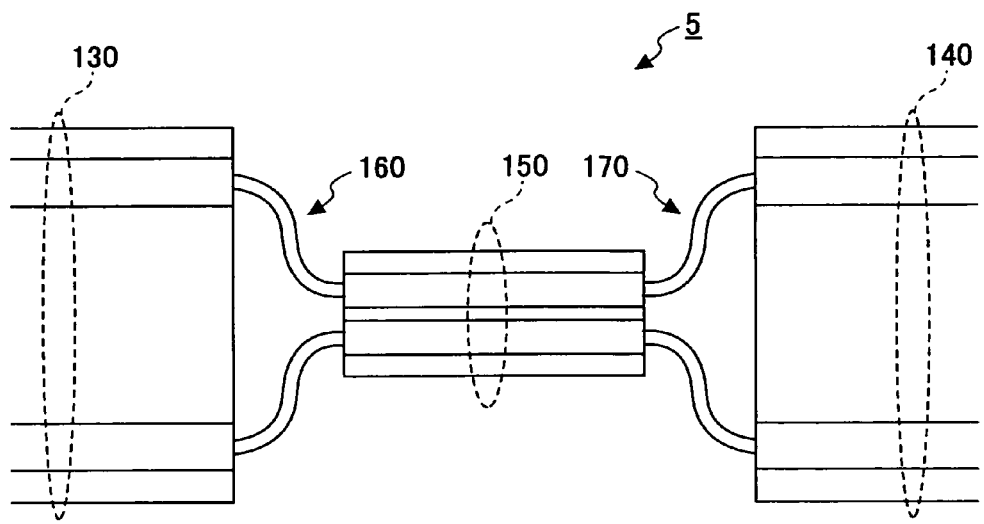
FIG. 6 is a sectional view of an optical control device according to a fifth embodiment of the present invention.

FIG. 6 is a sectional view of an optical control device 5 according to a fifth embodiment of the present invention. The optical control device 5 according to this embodiment shown in FIG. 6 is used for path switching or multiplexing and demultiplexing of a light signal. By bringing optical waveguides in which only a single mode is excited as close to each other as about the wavelength of a light signal, two types of waveguide modes, that is an even mode and an odd mode, are excited in the two close waveguides. The crests in the two cores are in phase in the even mode, but are opposite in phase in the odd mode. The field distribution by superposition is determined by these phase relationships. The phase difference varies in the direction of a propagation axis by a slight difference in propagation constant between the even mode and the odd mode. Therefore, light power varies periodically with respect to the direction of propagation between the two cores. Therefore, by bringing two waveguides close to each other, causing them to perform light propagation over an appropriate distance, and sufficiently separating the two waveguides from each other in the other area, it is possible to perform path switching and multiplexing and demultiplexing of a light signal. Such an optical control device is generally referred to as "directional coupler." An optical control device of a directional coupler type includes an optical coupling part in which two waveguides are close to each other, an optical input part to which a light signal is input, and an optical output part from which the light signal is output. The optical coupling part and each of the optical input part and the optical output part are connected via an optical separation part. In each of the optical input part and the optical output part, optical waveguides are disposed apart from each other by such a distance as to prevent optical coupling from occurring in the two waveguides.

The optical control device 5 of a directional coupler type shown in FIG. 6 includes an optical input part 130, an optical output part 140, an optical coupling part 150, and optical separation parts 160 and 170. The optical input part 130, the optical output part 140, and the optical coupling part 150 are formed of low index difference waveguides, and the optical separation parts 160 and 170 are formed of high index difference waveguides. The conventional optical waveguide is large in device size because of its large radius of curvature. On the other hand, in the optical control element 5 of this embodiment shown in FIG. 6, by forming the optical separation parts 160 and 170 of S-shaped waveguides, the optical separation parts 160 and 170 can be realized in a minute region, so that it is possible to miniaturize device size.

Further, although not graphically illustrated, in the case of forming the optical input part 130 and the optical output part 140 of high index difference waveguides, it is possible to perform directional coupling in the low index difference waveguides of the optical coupling part 150. At the same time, by joining the low index difference waveguides of the optical coupling part 150 to the high index difference waveguides serving as the optical input part 130 and the optical output part 140 while keeping the waveguide distance substantially uniform, it is possible to integrate a separation part such as the optical coupling part 150, and thereby to achieve further reduction in size.

Figure 7:
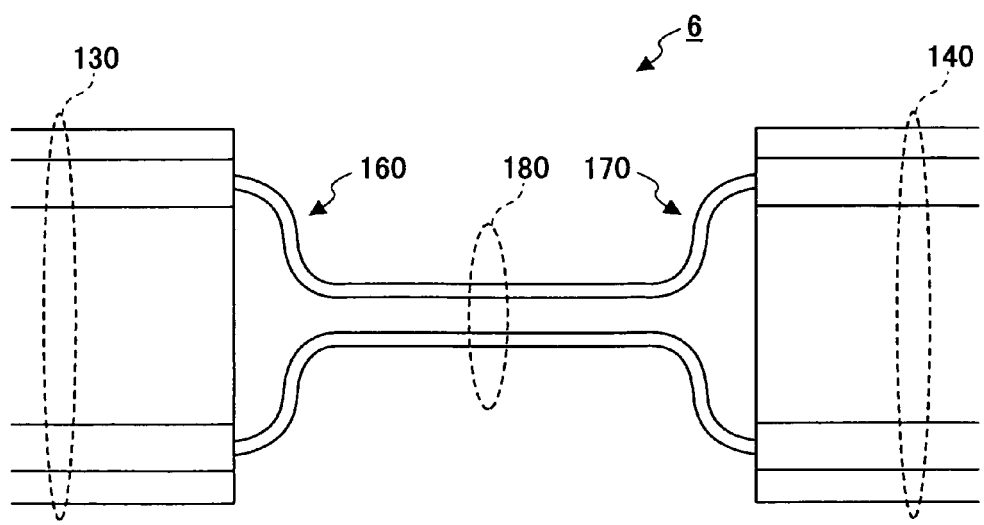
FIG. 7 is a sectional view of an optical control device according to a sixth embodiment of the present invention.

FIG. 7 is a sectional view of an optical control device 6 according to a sixth embodiment of the present invention. In FIG. 7, the same elements as those of FIG. 6 are referred to by the same reference numerals. The optical control device 6 of the sixth embodiment shown in FIG. 7 is also an optical control device of a directional coupler type, and includes the optical input part 130, the optical output part 140, the optical separation parts 160 and 170, and an optical coupling part 180. The optical input part 130 and the optical output part 140 are formed of low index difference waveguides, and the optical separation parts 160 and 170 and the optical coupling part 180 are formed of high index difference waveguides. In the conventional optical waveguide having a relative index difference of approximately 1%, the beat length, that is, a propagation distance required for light power to transfer completely from one optical waveguide to another optical waveguide, is approximately 1 mm, while the beat length can be reduced to approximately several tens of μm in an HIC waveguide having a relative index difference of 40% or higher. Therefore, according to this embodiment, a part for controlling a light signal can be minute, so that it is possible to reduce device size. Further, by using low index difference waveguides in the other optical interconnection parts that require no sharp curve or bending, it is possible to reduce the excessive loss of the device.

Figure 8:
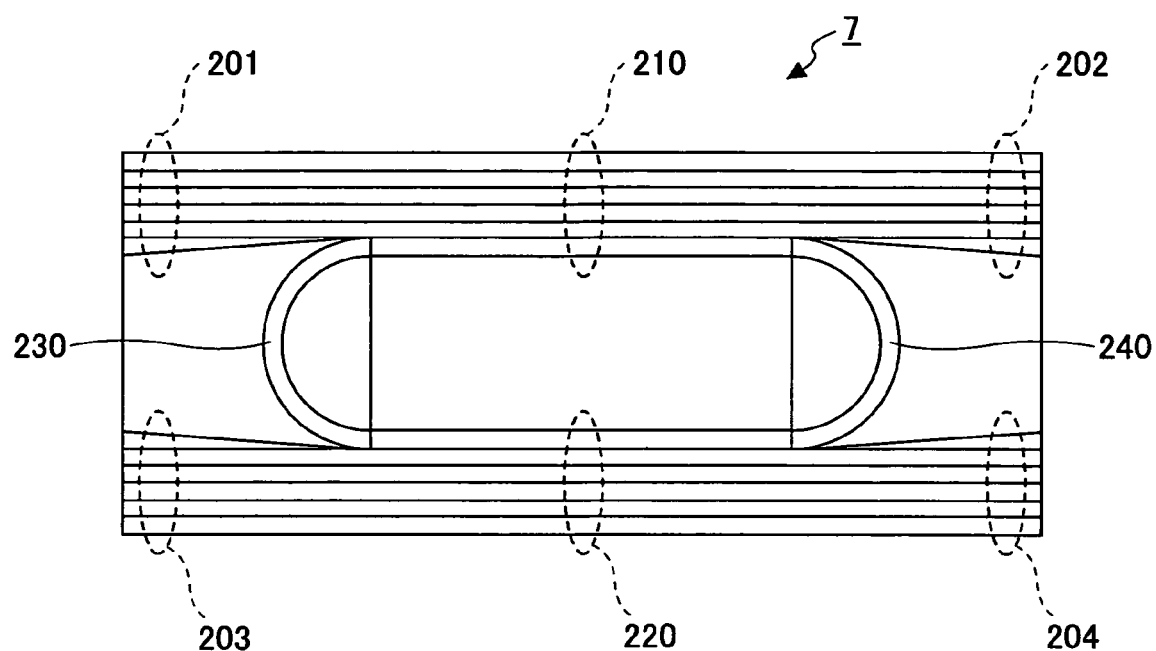
FIG. 8 is a sectional view of an optical control device according to a seventh embodiment of the present invention.

FIG. 8 is a sectional view of an optical control device 7 according to a seventh embodiment of the present invention. The optical control device 7 of this embodiment shown in FIG. 8 is used for multiplexing or demultiplexing a light signal of a specific wavelength, and is generally referred to as a wavelength multiplexer/demultiplexer of a ring resonator type. The optical control device 7 includes optical waveguides 201 through 204 for light input/output, optical coupling parts 210 and 220, and curved waveguides 230 and 240. One of the waveguides forming each of the optical coupling parts 210 and 220 is coupled to the curved waveguides 230 and 240. A ring-shaped waveguide is formed by the coupling of the optical coupling parts 210 and 220 to the curved waveguides 230 and 240. This ring waveguide serves as a resonator, and functions as a wavelength selector element. In the case of inputting a light signal from the waveguide 201, only when the optical path length around the ring resonator is an integral multiple of the wavelength of light, the light of the wavelength resonates in the resonator so as to be output from the optical waveguide 203. If light of a wavelength that does not resonate in the ring resonator is input from the optical waveguide 201, the light signal travels straight so as to be directly output from the optical waveguide 202. Thus, the ring resonator operates as a wavelength-selective multiplexer/demultiplexer, and can also be used as a switching device at a specific wavelength by changing a resonant wavelength. The resonant wavelength that resonates in the ring waveguide appears periodically. The gap between adjacent resonant wavelengths is referred to as "free spectrum range (FSR)." In the case of extracting a specific wavelength component, a larger FSP is desirable. For example, in order to realize such a large FSR as to be applicable to wavelength division multiplexing in optical fiber communications, it is necessary to reduce the radius of the ring resonator to approximately several μm. This can be realized only in an HIC waveguide having a relative index difference of 20% or higher. In this case, the device performance depends highly on the ratio of light power coupled to the ring waveguide in the optical coupling parts. Therefore, only the optical coupling parts may be formed of linear waveguides in order to facilitate control of the ratio of light power coupled in the optical coupling parts.

As described above, according to the optical control device of this embodiment, the optical path length of a resonator is reduced by employing high index difference waveguides for curved waveguides, and low index difference waveguides are employed for the waveguides other than the curved waveguides, that is, optical waveguides for light input/output and the linear waveguides of optical coupling parts, thereby making it possible to reduce optical loss due to sidewall roughness.

Figure 9:
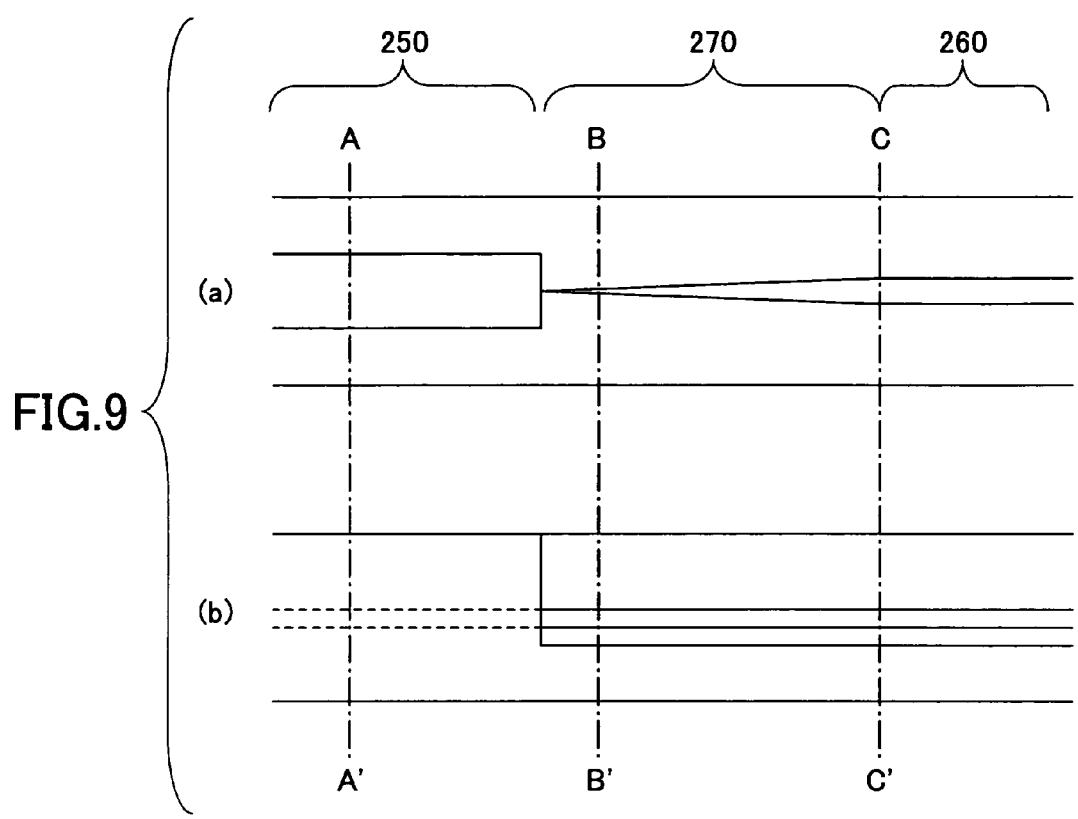
FIG. 9 is a diagram showing a first configuration for connecting a low index difference waveguide and a high index difference waveguide with low loss according to an eighth embodiment of the present invention.
Figure 10A:
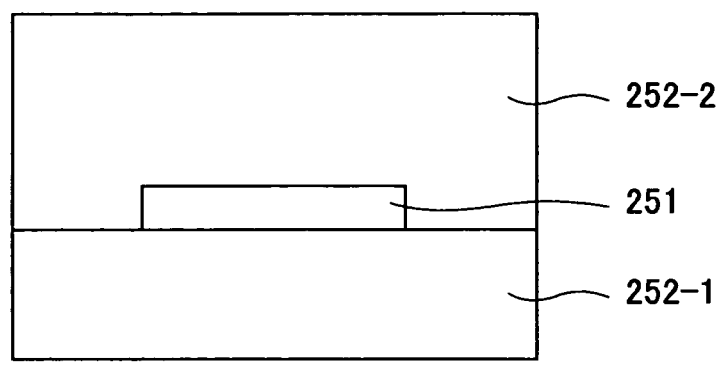
FIG. 10A is a cross-sectional view taken along the line A-A' of FIG. 9.
Figure 10B:
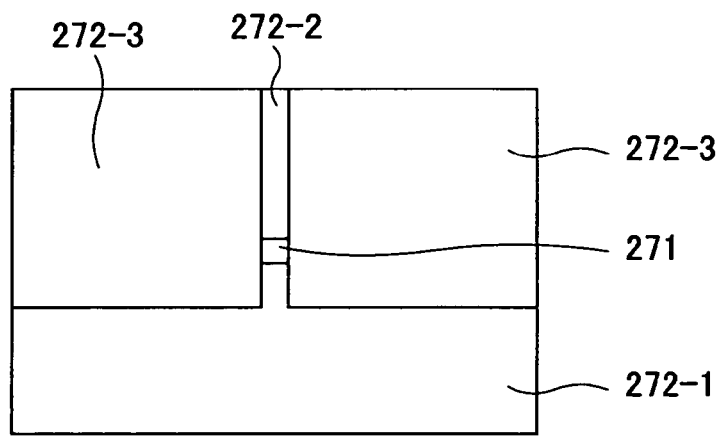
FIG. 10B is a cross-sectional view taken along the line B-B' of FIG. 9.
Figure 10C:
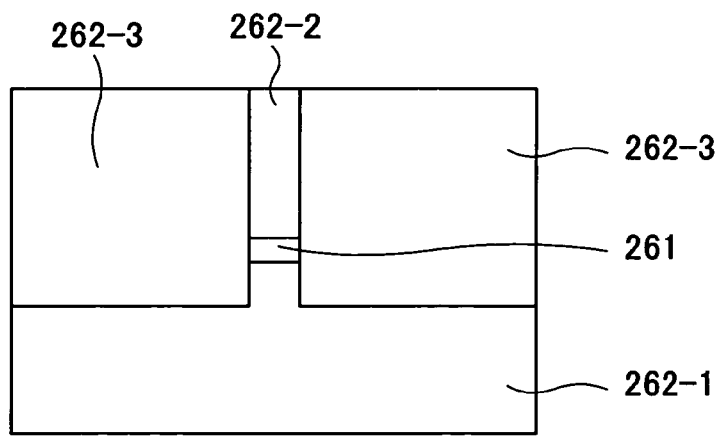
FIG. 10C is a cross-sectional view taken along the line C-C' of FIG. 9 according to the eighth embodiment of the present invention.

FIG. 9 is a diagram showing a first configuration for connecting a low index difference waveguide and a high index difference waveguide with low loss according to an eighth embodiment of the present invention. In FIG. 9, (a) shows a waveguide coupling part viewed from the upper surface side of a substrate, and (b) is a side view of the waveguide coupling part. As shown in FIG. 9, a low index difference waveguide 250 and a high index difference waveguide 260 are connected through an optical coupling part 270. FIG. 10A is a cross-sectional view taken along the line A-A' of FIG. 9, showing a cross-sectional shape of the low index difference waveguide 250. FIG. 10B is a cross-sectional view taken along the line B-B' of FIG. 9, showing a cross-sectional shape of the optical coupling part 270 on the side on which the optical coupling part 270 is in contact with the low index difference waveguide 250. FIG. 10C is a cross-sectional view taken along the line C-C' of FIG. 9, showing a cross-sectional shape of the optical coupling part 270 on the side on which the optical coupling part 270 is in contact with the high index difference waveguide 260. Further, the cross-sectional structure of the high index difference waveguide 260 has the same shape as FIG. 10C. In the low index difference waveguide 250, the high index difference waveguide 260, and the optical coupling part 270, a core 251 of the low index difference waveguide 250, a core 261 of the high index difference waveguide 260, and a core 271 of the optical coupling part 270 are formed of the same material, and the core 251, the core 261, and the core 271 have the same thickness in the low index difference waveguide 250, the high index difference waveguide 260, and the optical coupling part 270. Further, lower claddings 252-1, 262-1, and 272-1 in the low index difference waveguide 250, the high index difference waveguide 260, and the optical coupling part 270 are formed of the same material. Accordingly, it is possible to form the low index difference waveguide 250, the high index difference waveguide 260, and the optical coupling part 270 on the same substrate. The refractive index of an upper cladding 252-2 in the low index difference waveguide 250 is relatively close to the refractive index of the core material. Further, an upper cladding 262-2 and an upper cladding 272-2 in the high index difference waveguide 260 and the optical coupling part 270 are formed of the same material as the upper cladding 252-2 in the low index difference waveguide 250. Specifically, $SiO_2$ having a refractive index of approximately 1.45 is a preferable material. Further, side cladding 262-3 of the high index difference waveguide 260 and side claddings 272-3 of the optical coupling part 270 are formed of the same material, whose refractive index is extremely lower than that of the waveguide core material. For example, air having a refractive index of 1.0 is preferable as the material of the side claddings 262-3 and 272-3. In the following description, a pair of side claddings such as the side claddings 262-3 may be collectively referred to in a singular form as "side cladding" for convenience of description.

The core 251 in the low index difference waveguide 250 shown in FIG. 10A is shaped to have a wide structure. The width of the core 271 of the waveguide of the optical coupling part 270 sharply decreases as shown in FIG. 10B, and gradually increases as shown in FIG. 10C, so as to be finally equal to the width of the core 261 of the high index difference waveguide 260. At this point, the waveguide cross-sectional structure of the optical coupling part 270 and the waveguide cross-sectional structure of the high index difference waveguide 260 completely coincide with each other.

Here, a description is given below of the principle of coupling a low index difference waveguide and a high index difference waveguide with low propagation loss. First, in the low index difference waveguide, since the core-cladding refractive index difference is small, confinement of light in a core part is weak, so that a light electromagnetic field spreads widely into a cladding part. On the other hand, in an optical coupling part on the low index difference waveguide side, the core is extremely narrowed in width so as to weaken confinement of light in the core, thereby widening the spreading of a light electromagnetic field. By causing the low index difference waveguide and the optical coupling part to have substantially the same field shape at their boundary, it is possible to realize low-loss optical coupling. The optical waveguide width is caused to gradually increase from the optical coupling part 270 shown in FIG. 10B to the high index difference waveguide 260 shown in FIG. 10C. As the waveguide width increases, confinement of light in the core becomes stronger, so that in the high index difference waveguide 260 shown in FIG. 10C, the cross-sectional distribution of the light electromagnetic field of propagating light is completely equal to the electromagnetic field distribution of the high index difference waveguide 260. Accordingly, it is possible to realize low-loss optical coupling of the low index difference waveguide 250 and the high index difference waveguide 260.

Figure 11:
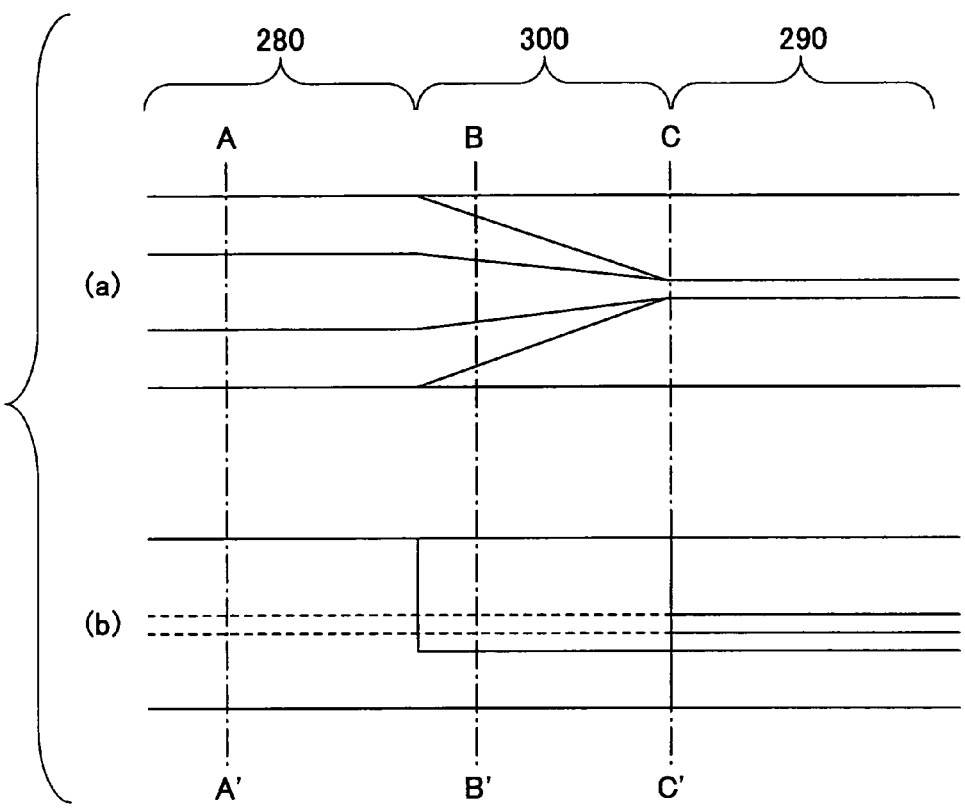
FIG. 11 is a diagram showing a second configuration for connecting a low index difference waveguide and a high index difference waveguide with low loss according to the eighth embodiment of the present invention.
Figure 12A:
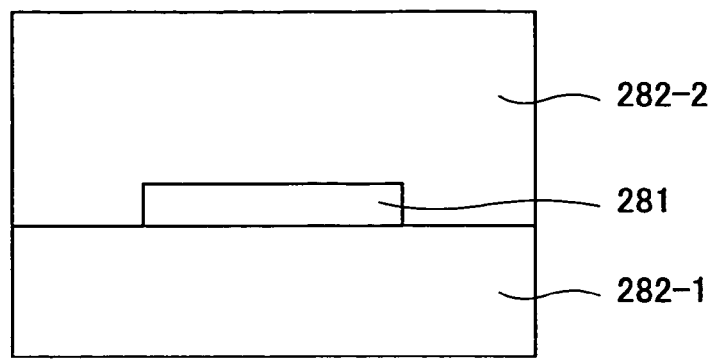
FIG. 12A is a cross-sectional view taken along the line A-A' of FIG. 11.
Figure 12B:
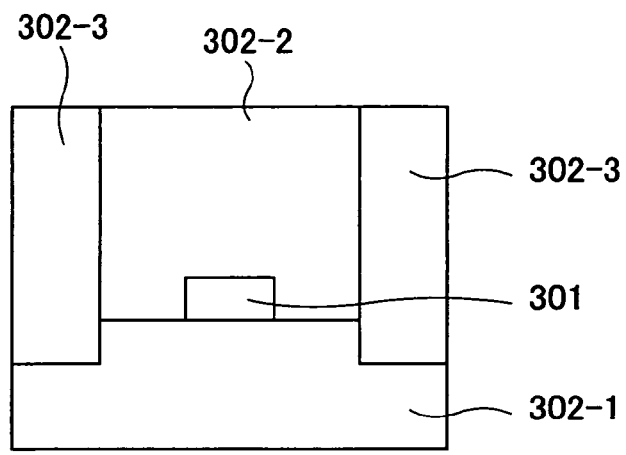
FIG. 12B is a cross-sectional view taken along the line B-B' of FIG. 11.
Figure 12C:
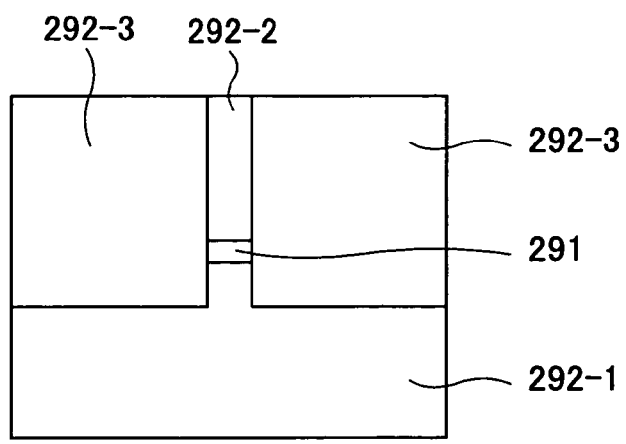
FIG. 12C is a cross-sectional view taken along the line C-C' of FIG. 11 according to the eighth embodiment of the present invention.

FIG. 11 is a diagram showing a second configuration for connecting a low index difference waveguide and a high index difference waveguide with low loss according to this embodiment. In FIG. 11, (a) shows a waveguide coupling part viewed from the upper surface side of a substrate, and (b) is a side view of the waveguide coupling part. As shown in FIG. 11, a low index difference waveguide 280 and a high index difference waveguide 290 are connected through an optical coupling part 300. FIG. 12A is a cross-sectional view taken along the line A-A' of FIG. 11, showing a cross-sectional shape of the low index difference waveguide 280. FIG. 12B is a cross-sectional view taken along the line B-B' of FIG. 11, showing a cross-sectional shape of the optical coupling part 300 on the side on which the optical coupling part 300 is in contact with the low index difference waveguide 280. FIG. 12C is a cross-sectional view taken along the line C-C' of FIG. 11, showing a cross-sectional shape of the optical coupling part 300 on the side on which the optical coupling part 300 is in contact with the high index difference waveguide 290. In the low index difference waveguide 280, the high index difference waveguide 290, and the optical coupling part 300, a core 281 of the low index difference waveguide 280, a core 291 of the high index difference waveguide 290, and a core 301 of the optical coupling part 300 are formed of the same material, and the core 281, the core 291, and the core 301 have the same thickness in the low index difference waveguide 280, the high index difference waveguide 290, and the optical coupling part 300. Further, lower claddings 282-1, 292-1, and 302-1 in the low index difference waveguide 280, the high index difference waveguide 290, and the optical coupling part 300 are formed of the same material. Accordingly, it is possible to form the low index difference waveguide 280, the high index difference waveguide 290, and the optical coupling part 300 on the same substrate. The refractive index of an upper cladding 282-2 in the low index difference waveguide 280 is relatively close to the refractive index of the core material. Further, an upper cladding 292-2 and an upper cladding 302-2 in the high index difference waveguide 290 and the optical coupling part 300 are formed of the same material as the upper cladding 282-2 in the low index difference waveguide 280.

The core 281 in the low index difference waveguide 280 shown in FIG. 12A is shaped to have a wide structure. The width of the core 301 gradually decreases in the optical coupling part 300 as shown in FIG. 12B so as to coincide with the core width of the high index difference waveguide 290 at the boundary therewith. Further, the width of each of side claddings 302-3 provided in the optical coupling part 300 is also caused to decrease. At the boundary with the high index difference waveguide 290, the side claddings 302-3 of the optical coupling part 300 are completely equal in structure to side claddings 292-3 of the high index difference waveguide 290. At this point, the waveguide cross-sectional structure of the optical coupling part 300 and the waveguide cross-sectional structure of the high index difference waveguide 290 completely coincide with each other.

Thus, in the low index difference waveguide, the electromagnetic field of light spreading widely from a core to a cladding is gradually confined strongly in the core by reducing the width of the core, and the width of the side part of the cladding is also reduced. As a result, it is possible to strongly confine light in the optical waveguide using total reflection occurring between the cladding of the low index difference waveguide and the cladding of the high index difference waveguide. Therefore, it is possible to realize low-loss optical coupling of the low index difference waveguide and the high index difference waveguide.

Figure 13:
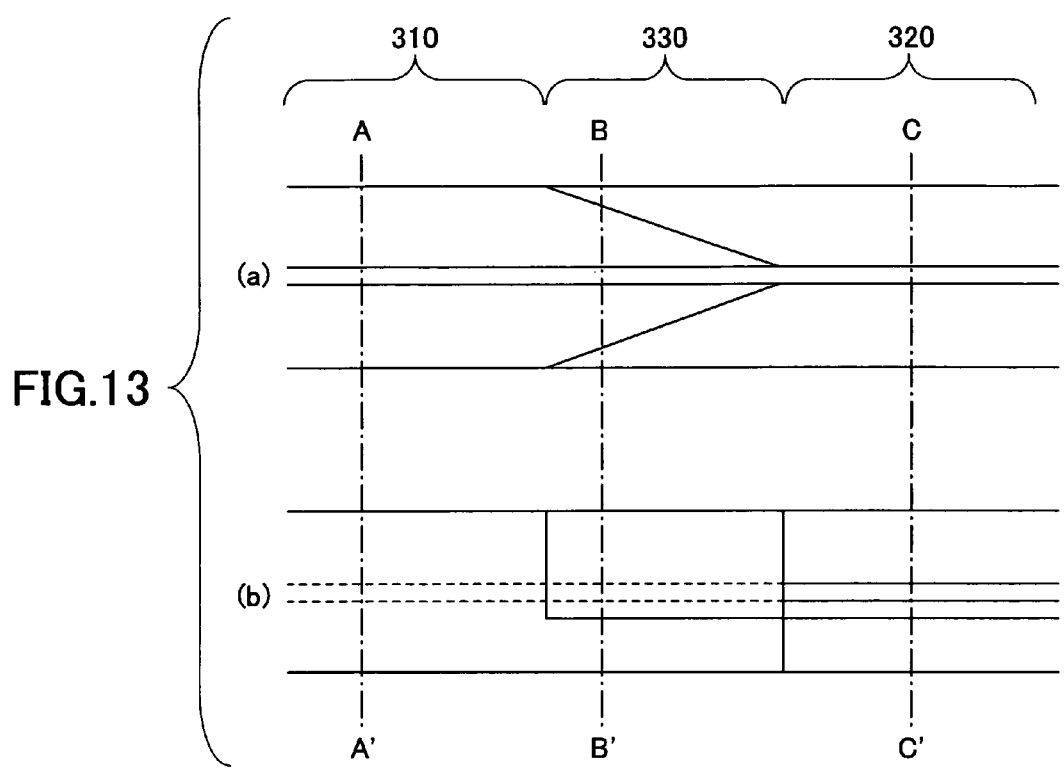
FIG. 13 is a diagram showing a third configuration for connecting a low index difference waveguide and a high index difference waveguide with low loss according to the eighth embodiment of the present invention.
Figure 14A:
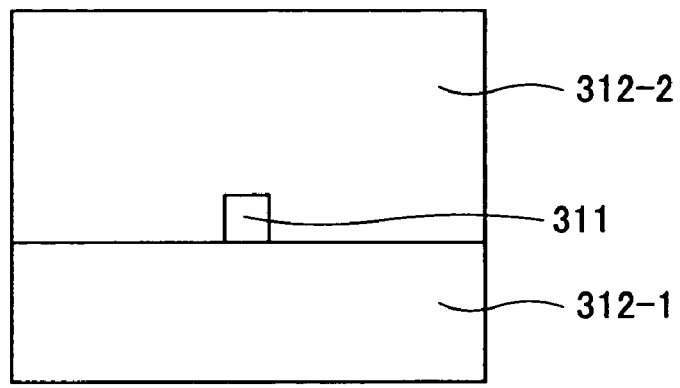
FIG. 14A is a cross-sectional view taken along the line A-A' of FIG. 13.
Figure 14B:
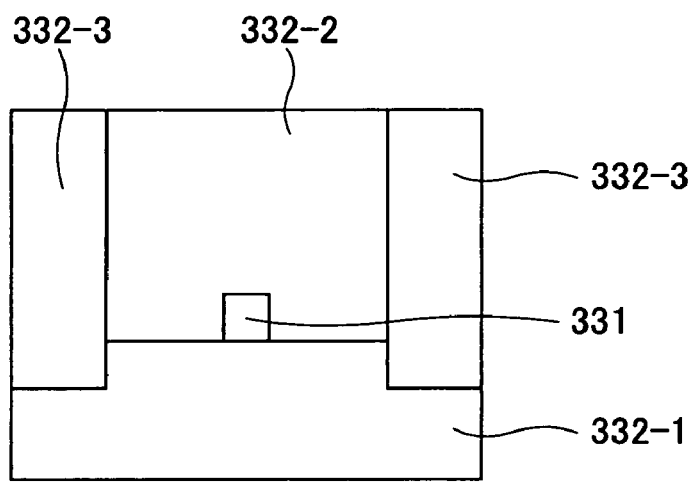
FIG. 14B is a cross-sectional view taken along the line B-B' of FIG. 13.
Figure 14C:
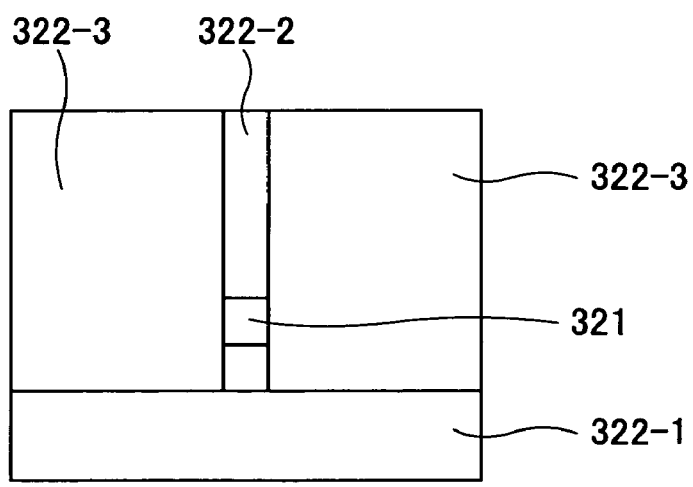
FIG. 14C is a cross-sectional view taken along the line C-C' of FIG. 13 according to the eighth embodiment of the present invention.

FIG. 13 is a diagram showing a third configuration for connecting a low index difference waveguide and a high index difference waveguide with low loss according to this embodiment. In FIG. 13, (a) shows a waveguide coupling part viewed from the upper surface side of a substrate, and (b) is a side view of the waveguide coupling part. As shown in FIG. 13, a low index difference waveguide 310 and a high index difference waveguide 320 are connected through an optical coupling part 330. FIG. 14A is a cross-sectional view taken along the line A-A' of FIG. 13, showing a cross-sectional shape of the low index difference waveguide 310. FIG. 14B is a cross-sectional view taken along the line B-B' of FIG. 13, showing a cross-sectional shape of the optical coupling part 330. FIG. 14C is a cross-sectional view taken along the line C-C' of FIG. 13, showing a cross-sectional shape of the high index difference waveguide 320. In the low index difference waveguide 310, the high index difference waveguide 320, and the optical coupling part 330, a core 311 of the low index difference waveguide 310, a core 321 of the high index difference waveguide 320, and a core 331 of the optical coupling part 330 are formed of the same material, and the core 311, the core 321, and the core 331 have the same thickness in the low index difference waveguide 310, the high index difference waveguide 320, and the optical coupling part 330. Further, lower claddings 312-1, 322-1, and 332-1 in the low index difference waveguide 310, the high index difference waveguide 320, and the optical coupling part 330 are formed of the same material. Accordingly, it is possible to form the low index difference waveguide 310, the high index difference waveguide 320, and the optical coupling part 330 on the same substrate. The refractive index of an upper cladding 312-2 in the low index difference waveguide 310 is relatively close to the refractive index of the core material. Further, an upper cladding 322-2 and an upper cladding 332-2 in the high index difference waveguide 320 and the optical coupling part 330 are formed of the same material as the upper cladding 312-2 in the low index difference waveguide 310. The width of a side cladding 332-3 provided in the optical coupling part 330 is gradually reduced. The side cladding 332-3 of the optical coupling part 330 is completely equal in structure to a side cladding 322-3 of the high index difference waveguide 320 at the boundary therewith. At this point, the waveguide cross-sectional structure of the optical coupling part 330 and the waveguide cross-sectional structure of the high index difference waveguide 320 completely coincide with each other.

Thus, there is a difference in refractive index between the low index difference waveguide and the high index difference waveguide by causing the low index difference waveguide and the high index difference waveguide to be equal in core width to and different in cladding refractive index from each other. The cross-sectional structure of the optical coupling part is equal to the cross-sectional structure of the low index difference waveguide at the boundary therewith, and is equal to the cross-sectional structure of the high index difference waveguide at the boundary therewith. In the optical coupling part, the width of the side cladding forming the low index difference waveguide is gradually reduced.

Further, the light input to the optical coupling part from the low index difference waveguide is gradually confined strongly in the core using the difference in refractive index between the side claddings. As a result, it is possible to realize low-loss optical coupling of the low index difference waveguide and the high index difference waveguide.

Figure 15:
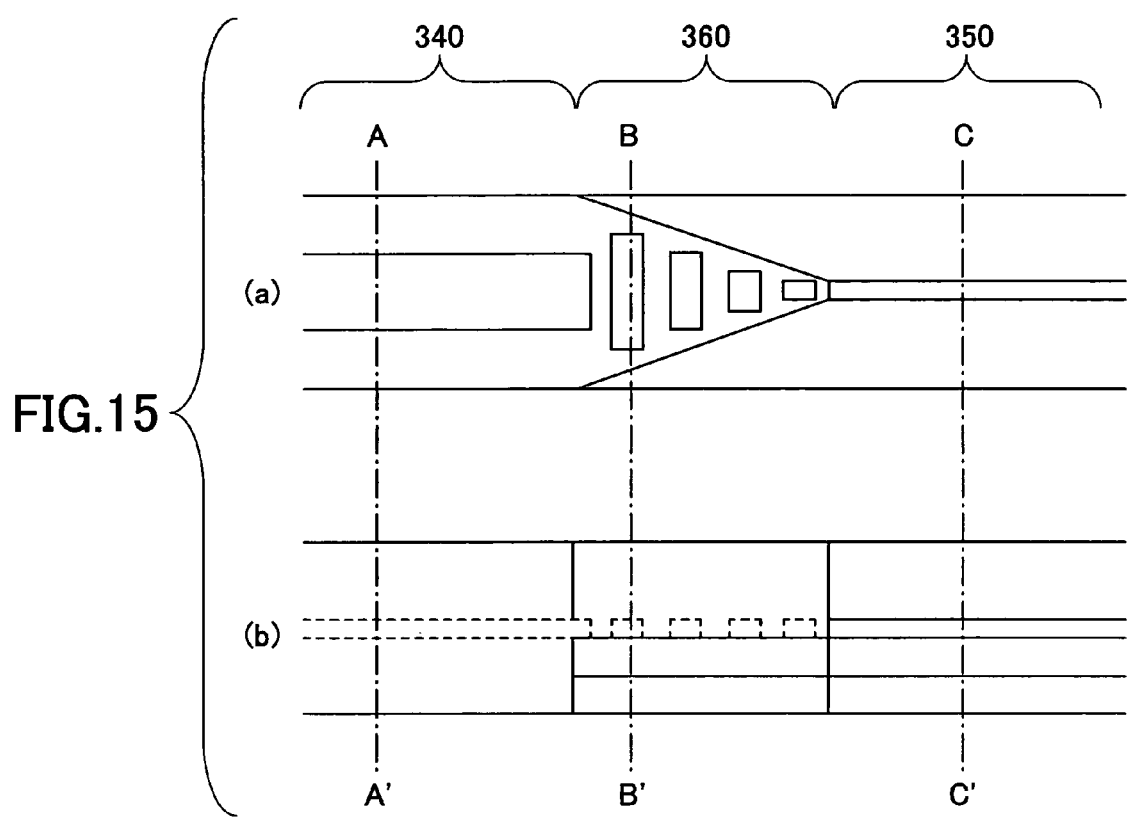
FIG. 15 is a diagram showing a fourth configuration for connecting a low index difference waveguide and a high index difference waveguide with low loss according to the eighth embodiment of the present invention.
Figure 16A:
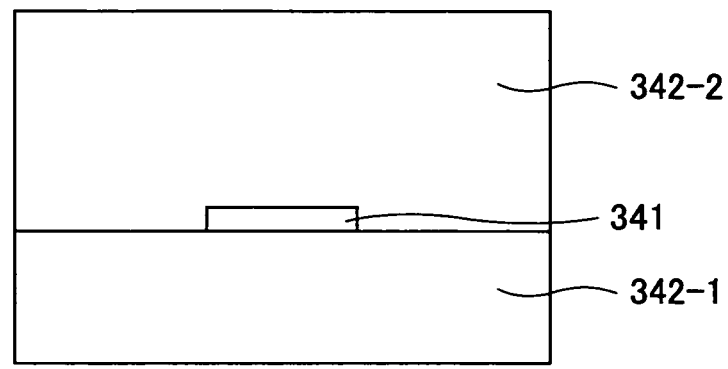
FIG. 16A is a cross-sectional view taken along the line A-A' of FIG. 15.
Figure 16B:
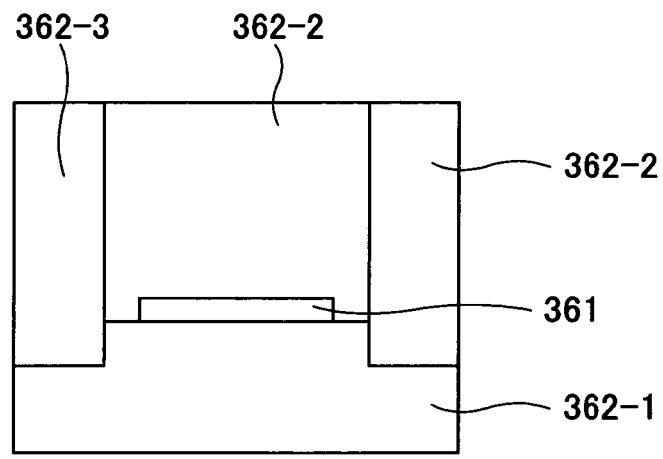
FIG. 16B is a cross-sectional view taken along the line B-B' of FIG. 15.
Figure 16C:
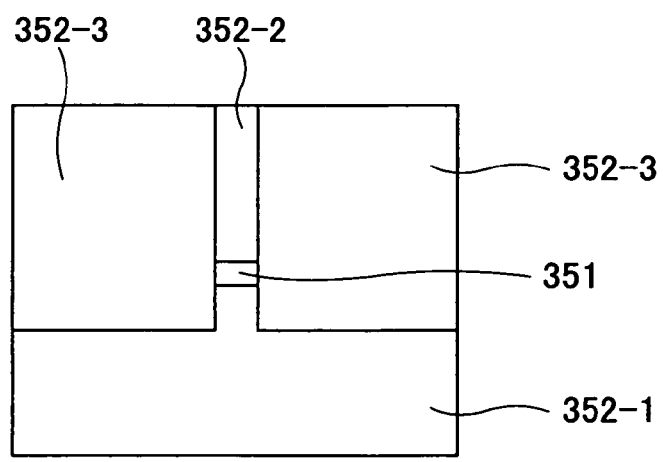
FIG. 16C is a cross-sectional view taken along the line C-C' of FIG. 15 according to the eighth embodiment of the present invention.

FIG. 15 is a diagram showing a fourth configuration for connecting a low index difference waveguide and a high index difference waveguide with low loss according to this embodiment. In FIG. 15, (a) shows a waveguide coupling part viewed from the upper surface side of a substrate, and (b) is a side view of the waveguide coupling part. As shown in FIG. 15, a low index difference waveguide 340 and a high index difference waveguide 350 are connected through an optical coupling part 360. FIG. 16A is a cross-sectional view taken along the line A-A' of FIG. 15, showing a cross-sectional shape of the low index difference waveguide 340. FIG. 16B is a cross-sectional view taken along the line B-B' of FIG. 15, showing a cross-sectional shape of the optical coupling part 360. FIG. 16C is a cross-sectional view taken along the line C-C' of FIG. 15, showing a cross-sectional shape of the high index difference waveguide 350. In the low index difference waveguide 340, the high index difference waveguide 350, and the optical coupling part 360, a core 341 of the low index difference waveguide 340, a core 351 of the high index difference waveguide 350, and a core 361 of the optical coupling part 360 are formed of the same material, and the core 341, the core 351, and the core 361 have the same thickness in the low index difference waveguide 340, the high index difference waveguide 350, and the optical coupling part 360. Further, lower claddings 342-1, 352-1, and 362-1 in the low index difference waveguide 340, the high index difference waveguide 350, and the optical coupling part 360 are formed of the same material. Accordingly, it is possible to form the low index difference waveguide 340, the high index difference waveguide 350, and the optical coupling part 360 on the same substrate. The refractive index of an upper cladding 342-2 in the low index difference waveguide 340 is relatively close to the refractive index of the core material. Further, an upper cladding 352-2 and an upper cladding 362-2 in the high index difference waveguide 350 and the optical coupling part 360 are formed of the same material as the upper cladding 342-2 in the low index difference waveguide 340. The width of a side cladding 362-3 provided in the optical coupling part 360 is gradually reduced. The side cladding 362-3 of the optical coupling part 360 is completely equal in structure to a side cladding 352-3 of the high index difference waveguide 350 at the boundary therewith. At this point, the waveguide cross-sectional structure of the optical coupling part 360 and the waveguide cross-sectional structure of the high index difference waveguide 350 completely coincide with each other.

Thus, the core is shaped to have a wide structure in the low index difference waveguide. In the optical coupling part, the core width is gradually reduced so as to coincide with the core width of the high index difference waveguide at the boundary therewith. Further, the width of a side cladding provided in the low index difference waveguide is also reduced. The side cladding is completely equal in structure to the side cladding of the high index difference waveguide at the boundary therewith. At this point, the waveguide cross-sectional structure of the optical coupling part and the waveguide cross-sectional structure of the high index difference waveguide completely coincide with each other. Further, according to this embodiment, the core in the optical coupling part is discontinuous in the light propagation direction.

Further, light propagating in the wide low index difference waveguide has its electromagnetic field spreading widely in the optical coupling part because the core disappears therein. Here, the side cladding of the low index difference waveguide has a high refractive index, and the side cladding of the high index difference waveguide has a low refractive index, so that the light is confined by total reflection at the boundary between the side claddings. As the width of the side cladding of the low index difference waveguide is gradually reduced, the electromagnetic field of the light is confined in a minute region so as to finally have the same electromagnetic field distribution as that of light that propagates in the high index difference waveguide. Further, according to this embodiment, a material having the same refractive index as the cores of the low index difference waveguide and the high index difference waveguide is provided in the optical coupling part. This exerts a lens effect, thereby helping light power move from the low index difference waveguide to the high index difference waveguide. As a result, it is possible to realize low-loss optical coupling of the low index difference waveguide and the high index difference waveguide.

Figure 17:
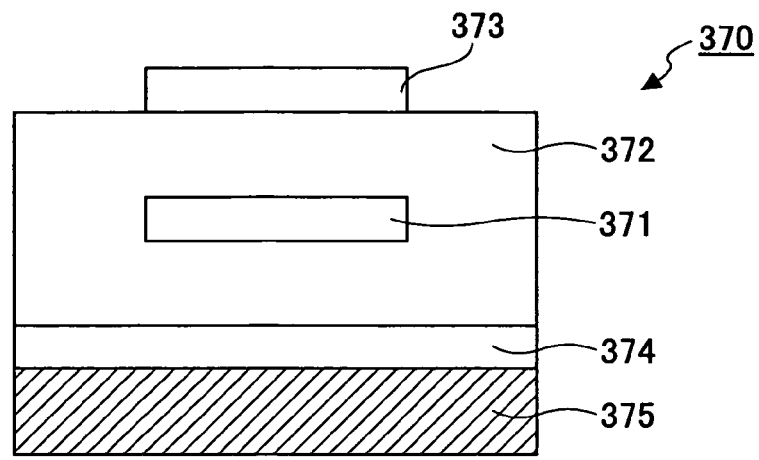
FIG. 17 is a diagram (cross-sectional view) showing a configuration for changing a characteristic of a low index difference waveguide according to a ninth embodiment of the present invention.
Figure 18:
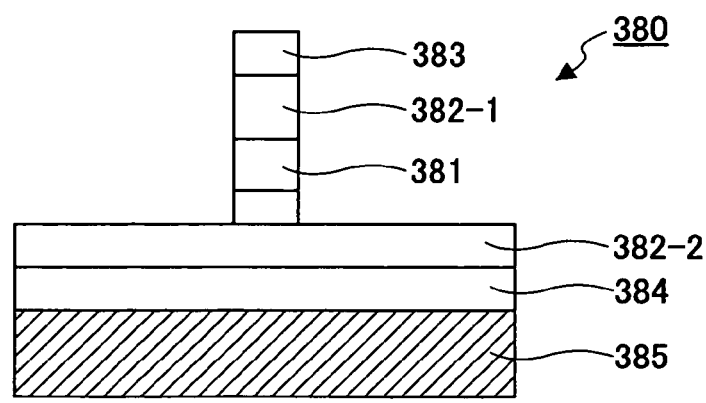
FIG. 18 is a diagram (cross-sectional view) showing a configuration for changing a characteristic of a high index difference waveguide according to the ninth embodiment of the present invention.
Figure 19A:
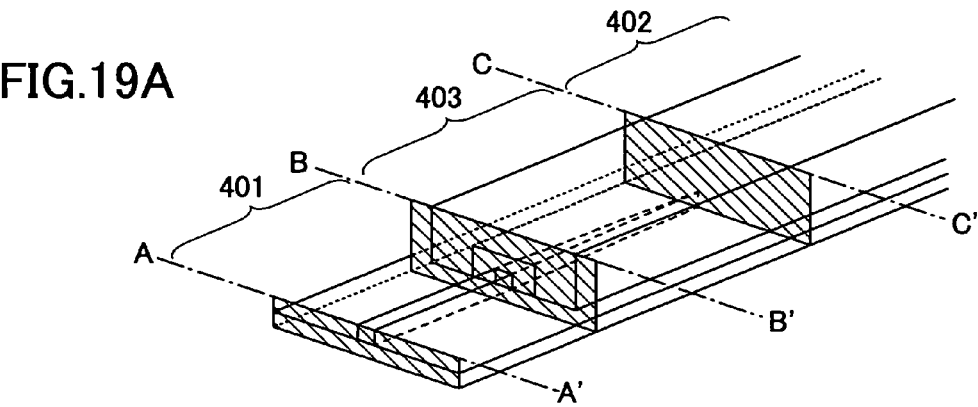
FIGS. 19A through 19F are diagrams showing a conventional optical integrated device.
Figure 19B:
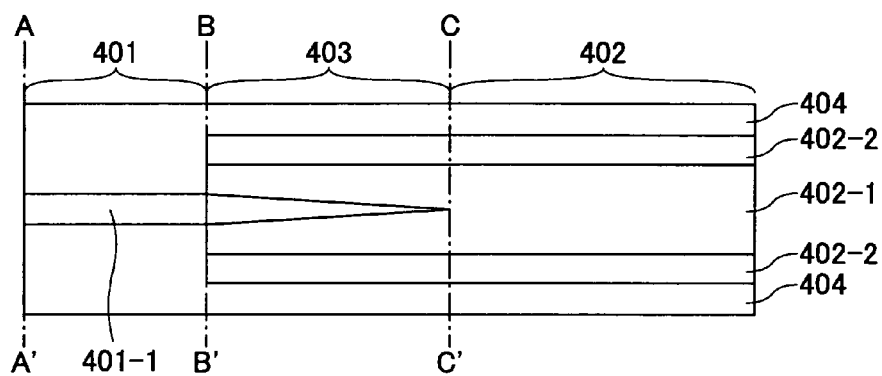
Figure 19C:
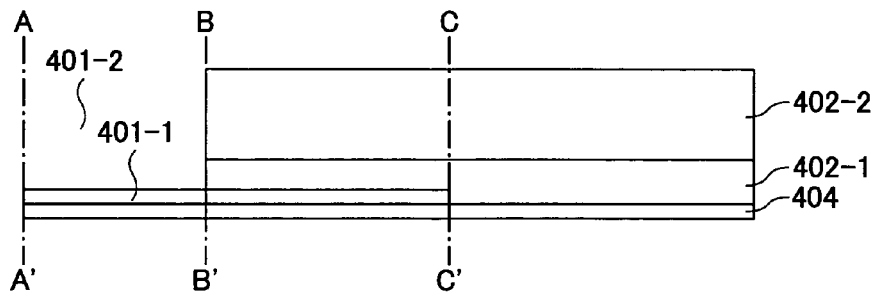
Figures 19D, 19E, 19F:
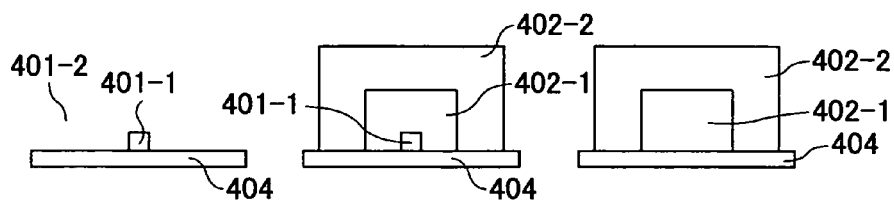

FIG. 17 is a diagram (cross-sectional view) showing a configuration for changing a characteristic of a low index difference waveguide according to a ninth embodiment of the present invention. A low index difference waveguide 370 shown in FIG. 17 includes a core 371, a cladding 372, an electrode 373 provided on the cladding 372, an electrode 374 provided under the cladding 372, and a substrate 375. Further, FIG. 18 is a diagram (cross-sectional view) showing a configuration for changing a characteristic of a high index difference waveguide according to this embodiment. A high index difference waveguide 380 shown in FIG. 18 includes a core 381, an upper cladding 382-1, an electrode 383 provided on the upper cladding 382-1, a lower cladding 382-2, an electrode 384 provided under the lower cladding 382-2, and a substrate 385.

In the case where the core 371 of the low index difference waveguide 370 and the core 381 of the high index difference waveguide 380 are formed of an electrooptic material in FIGS. 17 and 18, it is possible to vertically apply an electric field to the substrates 375 and 385 by applying voltage between the electrodes 373 and 374 provided in the low index difference waveguide 370 and between the electrodes 383 and 384 provided in the high index difference waveguide 380. With this electric field, it is possible to modulate the refractive index of each of the cores 371 and 381 by the electrooptic effect. Further, in the case where the core 371 of the low index difference waveguide 370 and the core 381 of the high index difference waveguide 380 are formed of a semiconductor material, by applying voltage between the electrodes 373 and 374 and between the electrodes 383 and 384, a current is supplied to the low index difference waveguide 370 and the high index difference waveguide 380, so that the refractive indices of the low index difference waveguide 370 and the high index difference waveguide 380 change. Further, by forming the electrode 373 of the low index difference waveguide 370 and/or the electrode 383 of the high index difference waveguide 380 of a metal film and applying voltage, the metal film has heat, that is, the metal film functions as a heater. By heating the low index difference waveguide 370 and/or the high index difference waveguide 380 with the heater, the refractive index of the material forming the low index difference waveguide 370 and/or the high index difference waveguide 380 changes. This change in temperature is conspicuous in a semiconductor material and a polymer material in particular.

Further, it is possible to dynamically change a characteristic of an optical control device by modulating the refractive index of a material forming a waveguide. For example, in the above-described directional couplers, by modulating the refractive index of the material of the optical coupling part, the optical path length of a waveguide forming the optical coupling part changes, so that it is possible to change the beat length of the directional coupler. Accordingly, it is possible to change the output ratio of the two optical waveguides forming the output part. Further, in the above-described optical control device of a ring resonator type, it is possible to change a wavelength that resonates in the resonator by changing the refractive index of a waveguide forming the resonator. Thereby, it is possible to realize a variable-wavelength wavelength multiplexer/demultiplexer. Further, employment of an electrooptic material or a semiconductor material, which enables high-speed refractive index modulation, makes it possible to cause the ring resonator to function as a switching device. Further, the band of a resonance spectrum, that is, the sharpness of a resonance peak, depends on the ratio of light power input into the resonator in the optical coupling part. This bandwidth can also be made variable by performing refractive index modulation on the optical coupling part.

Here, as described above, in order to reduce the insertion loss of the entire optical integrated circuit using the loss reduction effect, it is required to couple waveguides having difference relative index differences with low loss. Further, in general, the electromagnetic distribution of light that propagates in the low index difference waveguide and the electromagnetic distribution of light that propagates in the high index difference waveguide differ greatly from each other. In order to connect both waveguides with low loss, a structure called a spot size converter, which gradually changes the electromagnetic distribution of light, is required. For example, as shown in FIGS. 19A through 19F, in order to couple an HIC optical waveguide using silicon as a core and using air as a cladding to an optical fiber having a large spot size with low loss, in an optical coupling part 403, the end of a core 401-1 of a high index difference waveguide 401 is narrowed into a tapered shape, and the tapered core part is covered with a core 402-1 of a low index difference waveguide 402 having a large waveguide cross section. However, according to this configuration, the tapered core part should be several tens of μm to 1 mm in length. Further, since the width of the silicon core 401-1 of the high index difference waveguide 401 is reduced in a tapered manner, the width of the end of the core 401-1 is required to be 100 μm or less. As a result, an advanced microfabrication technology is required.

Therefore, in the following embodiments of the present invention, a description is given of configurations of optical coupling parts that achieve low-loss coupling of optical waveguides having different refractive index differences with a shorter transition distance; and are easy to fabricate.

Figure 20A:
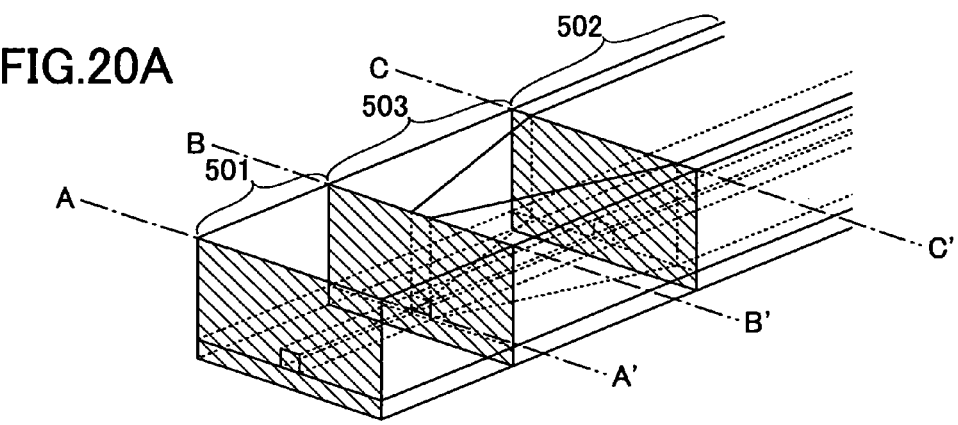
FIGS. 20A through 20F are diagrams showing an optical integrated device according to a tenth embodiment of the present invention.
Figure 20B:
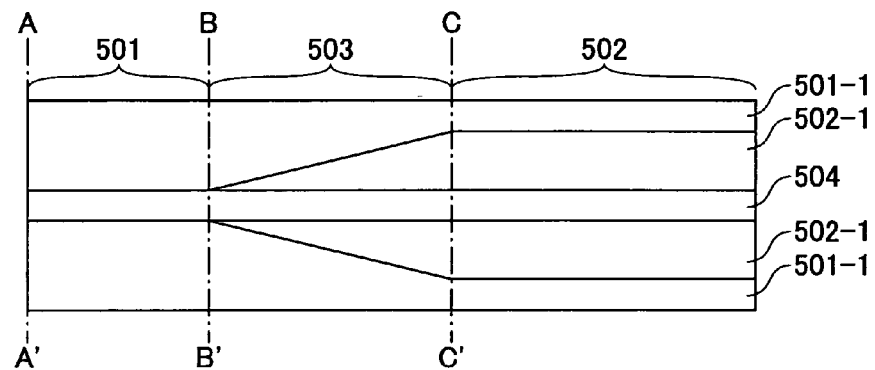
Figure 20C:
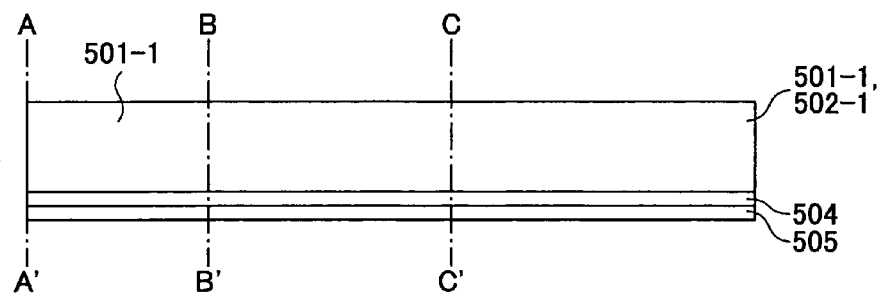
Figure 20D:
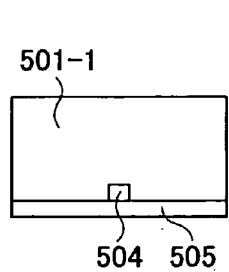
Figures 20E, 20F:
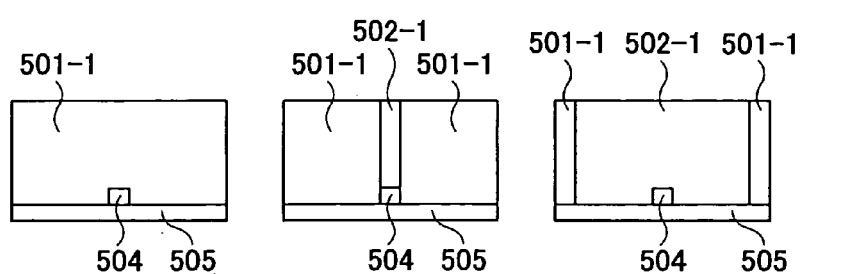

FIGS. 20A through 20F are diagrams showing an optical integrated device according to a tenth embodiment of the present invention. FIGS. 20A through 20C are a perspective view, a plan view, and a side view, respectively, of the optical integrated device of this embodiment. FIG. 20D is a cross-sectional view taken along the line A-A' of FIGS. 20A through 20C. FIG. 20E is a cross-sectional view taken along the line B-B' of FIGS. 20A through 20C. FIG. 20F is a cross-sectional view taken along the line C-C' of FIGS. 20A through 20C. The optical integrated device of this embodiment shown in FIGS. 20A through 20F includes a composite optical waveguide formed by coupling optical waveguides having different relative index differences. According to the optical integrated device of this embodiment, a high index difference optical waveguide 501 and a low index difference optical waveguide 502 are coupled to each other through an optical coupling part 503. Further, the high index difference optical waveguide 501, the low index difference optical waveguide 502, and the optical coupling part 503 are formed on a common substrate 505. Further, the optical coupling part 503 has a waveguide structure, and the width of a cladding 502-1 in the optical coupling part 503 increases in an inversely tapered manner with transition from the high index difference optical waveguide 501 to the low index difference optical waveguide 502. Further, the cross section of a waveguide core 504 is the same fixed size in any optical waveguide. The cross-sectional structures of the optical waveguide of the optical coupling part 503 and the low index difference optical waveguide 502 eventually coincide with each other at the connection of the optical waveguide cross-sectional structure of the optical coupling part 503 and the low index difference optical waveguide 502. In this embodiment, the width of the cladding 502-1 in the optical coupling part 503 changes in a tapered (or inversely tapered) manner. However, the manner of changing of the width is not limited to this.

It is desirable that the high index difference optical waveguide 501 have a relative index difference of 10% or higher. In the case of forming a curved interconnection with an optical waveguide having such a relative index difference, it is possible to bend or curve an optical path substantially without loss even with a minute radius of curvature of 100 μm or less. In order to realize such an optical waveguide having an extremely large core-cladding refractive index difference, it is necessary for the core to have a high refractive index. More specifically, suitable core materials include semiconductor materials such as silicon; optical crystals of lithium niobate, lithium tantalate, etc.; ceramic material such as PZT and PLZT; high refractive index glass such as $SiO_2$ heavily doped with $Ta_2O_5$ or $TiO_2$, and silicon oxynitride (SiON); and polymer materials. By covering the core formed of a material as described above with a low refractive index material such as air or $SiO_2$, it is possible to realize a high index difference optical waveguide having a relative index difference of 10% or higher.

For example, by forming the core of silicon having a refractive index of 3.5 and forming the cladding of air having a refractive index of 1.0, it is possible to increase the relative index difference up to 46%. Further, in the case of using a glass material or an optical crystal material of a refractive index of approximately 2.0, it is also possible to increase the index difference up to approximately 38%, and it is possible to bend or curve an optical waveguide with a radius of curvature of several μm to several tens of μm.

Figure 21:
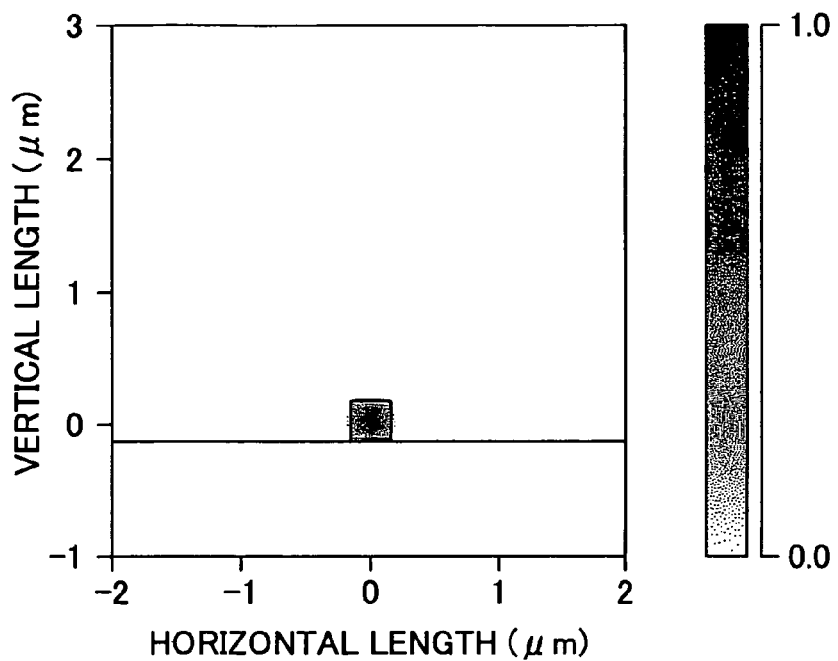
FIG. 21 shows a calculation of a propagation mode confined in a high index difference waveguide, and a field intensity distribution according to the tenth embodiment of the present invention.

Further, since the core-cladding refractive index difference is extremely large in the high index difference optical waveguide, the cross-sectional size of a core is extremely small in order for the optical waveguide to operate with a single mode. Specifically, when the refractive index of a core is 2.0 and the refractive index of a cladding is 1.0, the size of a core cross section is preferably about 400×400 $nm^2$ at a wavelength of 850 nm. FIG. 21 shows a calculation of a propagation mode confined in a high index difference waveguide. In the case shown in FIG. 21, the refractive index of a substrate serving as a lower cladding is 1.45, the refractive index of a core is 2.17, and the refractive index of a cladding around the core is 1.0. The size of a core cross section is 400×400 $nm^2$, and the field intensity distribution of a fundamental mode with respect to light of a wavelength of 850 nm is shown. FIG. 21 shows that propagating light is confined only in the minute core and its vicinity. This strong light confinement effect contributes to minute bending or curving with low loss.

On the other hand, as the low index difference waveguide, an optical waveguide having a relative index difference of approximately 1% or lower is suitable.

It is generally known that the propagation loss of light that propagates in an optical waveguide is proportional to a relative index difference to the $2.5^{th}$ power. Accordingly, for example, by replacing a linear interconnection formed of a high index difference optical waveguide having a relative index difference of 30% with a low index difference waveguide having a relative index difference of 1%, it is possible to reduce the propagation loss to approximately 1/5000. Using this loss reduction effect, it is possible to significantly reduce the insertion loss of the entire device in an optical control device that requires a waveguide length greater than or equal to the cm order, such as an optical delay line.

Normally, the conventional silica-based optical waveguide has a relative index difference of approximately 1% or lower, and has a quadrangular cross section of approximately 5 to 8 μm per side in size. Even if the cross-sectional size of a core is equal to or less than approximately 1 μm, the above-described effect of reducing propagation loss is maintained. Therefore, the high index difference optical waveguide and the low index difference optical waveguide may be substantially equal in core cross section size. It is particularly preferable in terms of easiness in fabrication that the core material be common to and the core thickness be the same in both waveguides.

Further, in order to form the low index difference optical waveguide of the same core material as the high index difference waveguide, a material having a higher refractive index than a cladding used in the high index difference optical waveguide may be employed as the cladding of the low index difference waveguide. For example, the refractive index of a SiON material can be adjusted within a wide range of 1.5 to approximately 2.0 depending on its nitrogen content. Further, it is also possible to increase the refractive index of a $Ta_2O_5$-doped $SiO_2$ material to 2.0 or higher by increasing the doping amount. By using such a high refractive index material as a cladding material, and thereby reducing the difference in refractive index between the core and the cladding, it is possible to realize a low index difference optical waveguide.

Figure 22:
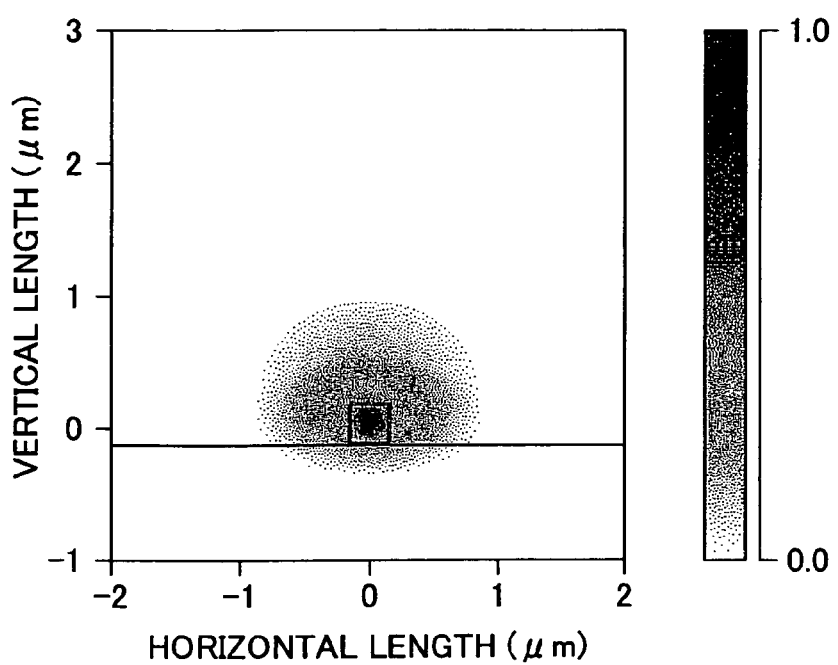
FIG. 22 shows a calculation of a propagation mode confined in a low index difference waveguide, and a field intensity distribution according to the tenth embodiment of the present invention.

FIG. 22 shows a calculation of a propagation mode confined in a low index difference optical waveguide. In the case shown in FIG. 22, the refractive index of a substrate serving as a lower cladding is 1.45, the refractive index of a core is 2.17, and the refractive index of a cladding around the core is 2.0. The size of the core is 400×400 $nm^2$, which is the same as that of the high index difference optical waveguide, and the field intensity distribution of a fundamental mode with respect to light of a wavelength of 850 nm is shown. FIG. 22 shows that the electric field of the fundamental propagation mode in the low index difference optical waveguide has a wide distribution up to the cladding area. In this case, since it is assumed that the low index difference optical waveguide and the high index difference optical waveguide are formed on the same substrate, the refractive index of each substrate is 1.45. Therefore, in the low index difference optical waveguide, the electric field of the fundamental propagation mode leaks out to the cladding area having a higher refractive index.

Here, referring to FIGS. 20A through 20F, the size of the cladding area is determined so that the electromagnetic field of light that propagates in the optical waveguides 501 and 502 sufficiently attenuates in a cladding 501-1 of the high index difference optical waveguide 501 and in the cladding 502-1 of the low index difference optical waveguide 502. Further, in the optical coupling part 503, the evanescent components of an electromagnetic field distribution of propagating light in an optical waveguide cross section are shared by the two types of cladding layers 501-1 and 502-1. However, since the width of the cladding 502-1 increases in an inversely tapered manner, many evanescent components of the light converge in the area of the cladding 502-1 as the light propagates from the high index difference optical waveguide 501 side to the low index difference optical waveguide 502 side. By slowly changing the width of the cladding 502-1 in the optical coupling part 503, the electromagnetic field intensity distribution of light that propagates in the optical coupling part 503 is caused to change gradually, so that it is possible to couple the optical waveguides 501 and 502, which are different in the electromagnetic field intensity distribution of a propagation mode, through the optical coupling part 503.

As described above, conventionally, in order to couple a high index difference optical waveguide and a single-mode optical fiber with low loss, the core of the high index difference optical waveguide is embedded in the core of a low index difference optical waveguide, and the width of the core of the high index difference optical waveguide is reduced little by little in a tapered manner so as to disappear in the core of the low index difference optical waveguide as shown in FIGS. 19A through 19F. According to this structure, since the optical waveguides whose respective cores are totally different in material are coupled, the taper length is significantly long, approximately several hundred μm. Further, it is necessary to control the eventual core width of the high index difference optical waveguide to 100 nm or less, so that an advanced fabrication technology is required.

On the other hand, in the method of coupling optical waveguides different in relative index difference according to one aspect of the present invention, the optical waveguides are basically equal in core material and core cross-sectional size, so that light always propagates in the same core material. Accordingly, it is possible to reduce the taper length. Further, the width of a cladding that is caused to change in a tapered manner is as large as the core width of the high index difference optical waveguide even where the width of the cladding is smallest. This facilitates fabrication.

Figure 23:
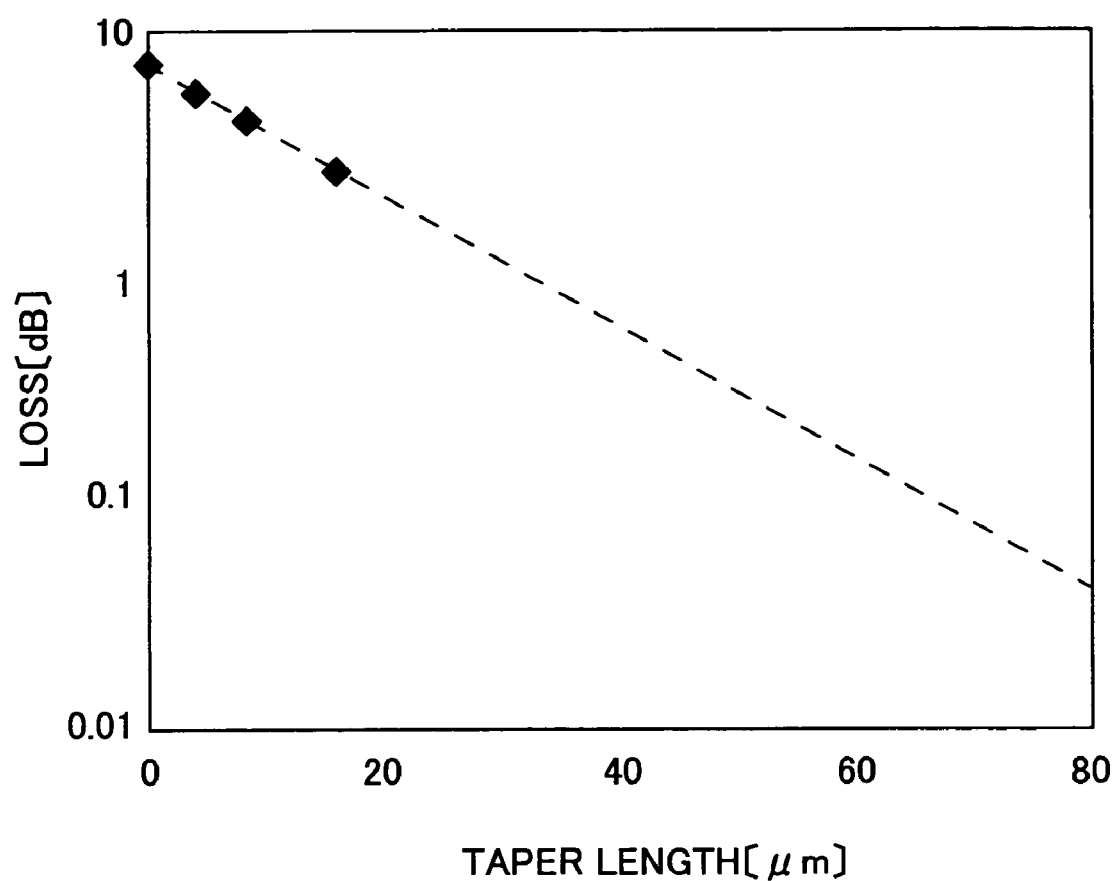
FIG. 23 is a characteristic diagram showing the results of calculating changes in propagation loss with respect to taper length in an optical coupling part according to the tenth embodiment of the present invention.
Figure 24A:
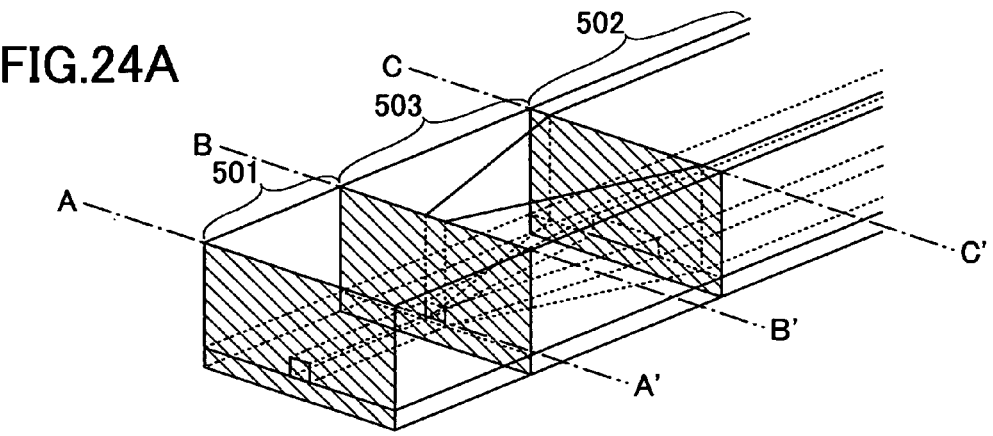
FIGS. 24A through 24F are diagrams showing an optical integrated device according to an $11^{th}$ embodiment of the present invention.
Figure 24B:
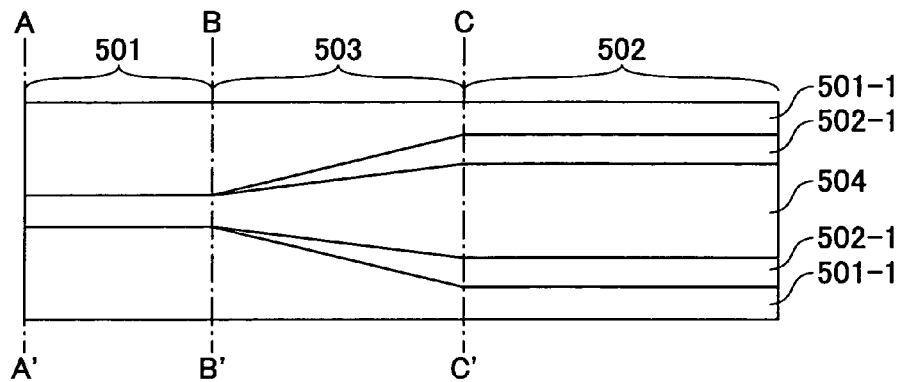
Figure 24C:
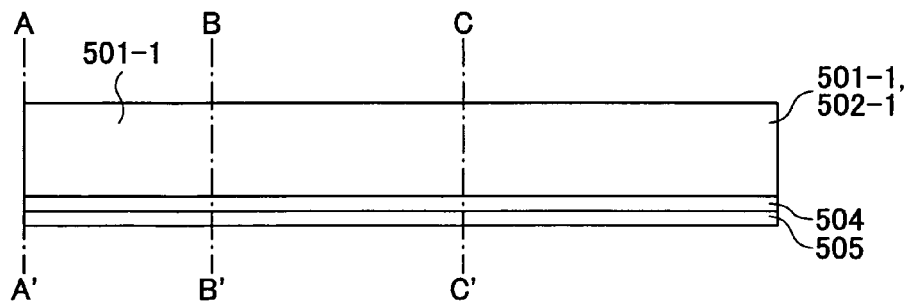
Figures 24D, 24E, 24F:
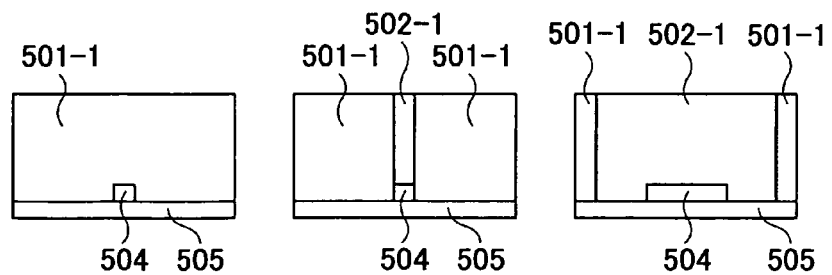

The loss at the time of propagating light in the composite waveguide shown in FIGS. 20A through 20F is analyzed by a three-dimensional FDTD simulation. Specifically, light is propagated in the composite optical waveguide formed of a high index difference optical waveguide, an optical coupling part, and a low index difference optical waveguide, and the loss at the time of coupling the optical waveguides different in relative index difference is calculated by comparing input light power and output light power. In the analysis, a change in propagation loss with respect to the taper length in the optical coupling part is calculated. The parameters used for the calculation are as follows. It is assumed that the refractive index of a substrate is 1.45, the refractive index of a core is 2.17, and the refractive index of a cladding around the core is 2.0. The cross-sectional size of the core is 400×400 $nm^2$ in each optical waveguide. As a result of the above-described combination of refractive indices, the relative index difference in the high index difference optical waveguide is 39%, and the relative index difference in the low index difference optical waveguide is approximately 7.5%. Further, it is assumed that the wavelength of propagating light is 850 nm. The calculation results are shown in FIG. 23. FIG. 23 shows that the greater the taper length, the lower the loss. Compared with the case of a taper length of 0 μm, that is, the case of directly coupling the high index difference optical waveguide and the low index difference optical waveguide, the coupling loss can be reduced by approximately 5 dB by interposing an optical coupling part having a taper length of 20 μm between the optical waveguides. It is estimated that in the case where the taper length is greater than the calculated plotted points, the coupling loss can be less than or equal to 0.1 dB by making the taper length greater than or equal to approximately 60 μm.

In the above-described composite optical waveguide of FIGS. 20A through 20F, the optical waveguides forming the composite optical waveguide are equal in core size. Alternatively, it is also effective to slightly increase the core width of the low index difference optical waveguide 502 as shown in FIGS. 24A through 24F, which are diagrams showing an optical integrated device according to an $11^{th}$ embodiment of the present invention. If the core-cladding refractive index difference is reduced, the core size for single mode operation can be increased. In this embodiment, the core 504 has the same thickness in all the waveguides, but it is possible to satisfy single mode conditions even if the core width of the low index difference optical waveguide 502 is increased. Increasing the core width of the low index difference optical waveguide 502 makes it possible to strengthen confinement of light in the core 504, so that it is possible to reduce the difference between the electric field distribution of light that propagates in the low index difference optical waveguide 502 and the electric field distribution of light that propagates in the high index difference optical waveguide 501. As a result, it is possible to reduce the taper length in the optical coupling part 503.

Figure 25A:
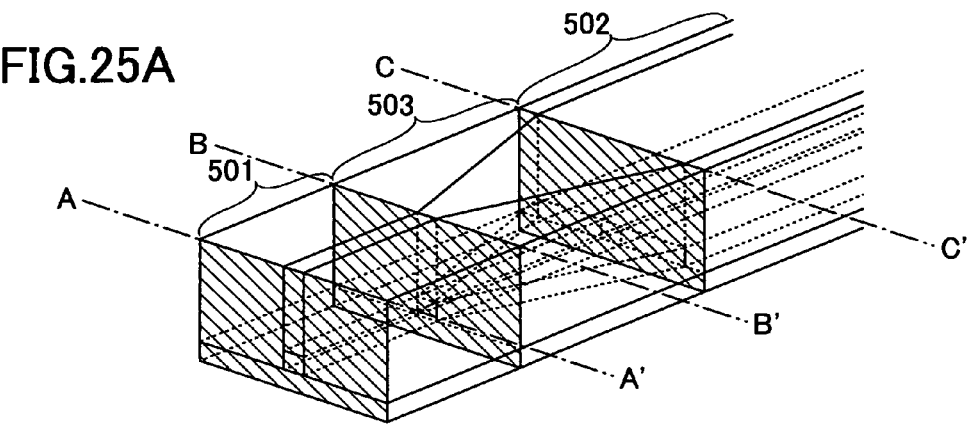
FIGS. 25A through 25F are diagrams showing an optical integrated device according a $12^{th}$ embodiment of the present invention.
Figure 25B:
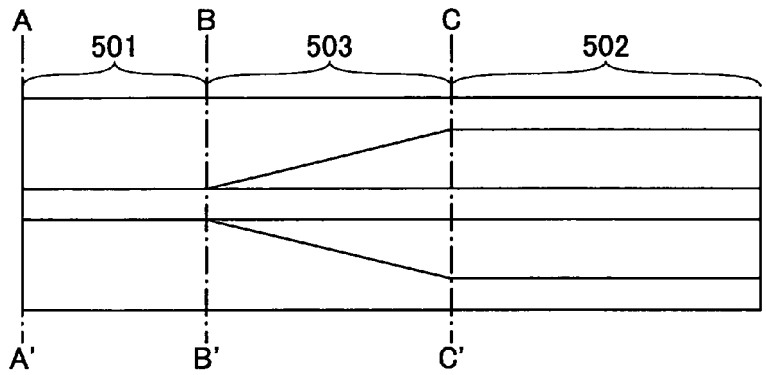
Figure 25C:
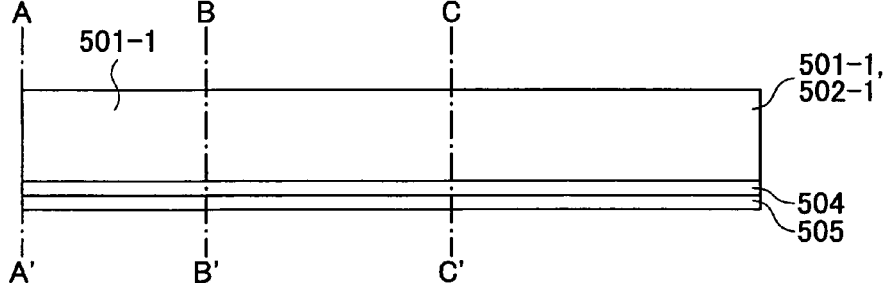
Figure 25D:
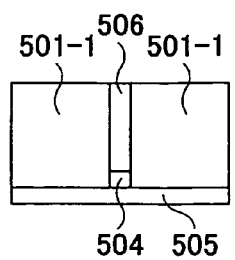
Figure 25E:
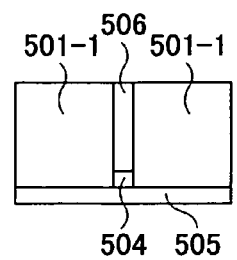
Figure 25F:
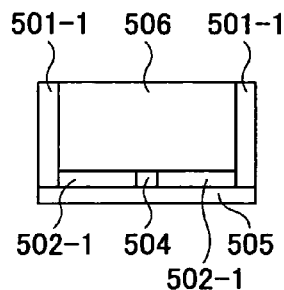

FIGS. 25A through 25F are diagrams showing an optical integrated device according a $12^{th}$ embodiment of the present invention. FIGS. 25A through 25C are a perspective view, a plan view, and a side view, respectively, of the optical integrated device of this embodiment. FIG. 25D is a cross-sectional view taken along the line A-A' of FIGS. 25A through 25C. FIG. 25E is a cross-sectional view taken along the line B-B' of FIGS. 25A through 25C. FIG. 25F is a cross-sectional view taken along the line C-C' of FIGS. 25A through 25C. In FIGS. 25A through 25F, the same elements as those of FIGS. 20A through 20F are referred to by the same reference numerals. The optical integrated device of this embodiment shown in FIGS. 20A through 20F is a composite optical waveguide formed by coupling the high index difference optical waveguide 501 and the low index difference optical waveguide 502 through the optical coupling part 503 having a tapered structure. In each of the optical waveguides shown in FIGS. 25D through 25F, the core 504 is formed on the substrate 505. The widthwise (sidewise) surfaces of the core 504 are covered with the cladding 501-1 in the high index difference optical waveguide 501, and are covered with the cladding 502-1 in the low index difference optical waveguide 502. Further, another cladding 506 formed of a material different from that of the cladding 501-1 is provided on the core 504 in each optical waveguide. Here, the cladding 506 has substantially the same refractive index as the substrate 505.

Figure 26:
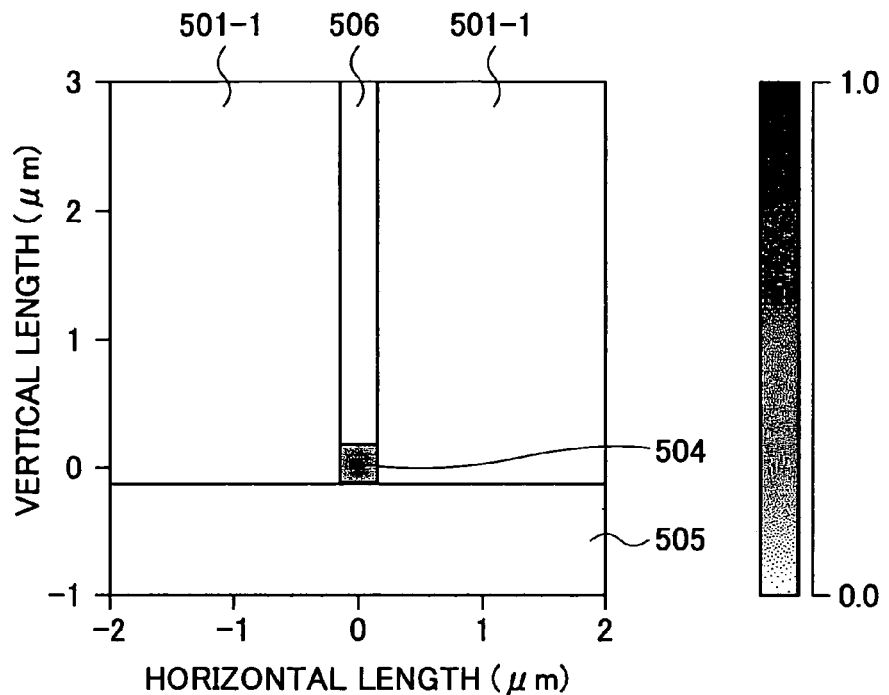
FIG. 26 shows a field intensity distribution of propagating light in a high index difference optical waveguide with the results of calculating the field intensity distribution according to the $12^{th}$ embodiment of the present invention.
Figure 27:
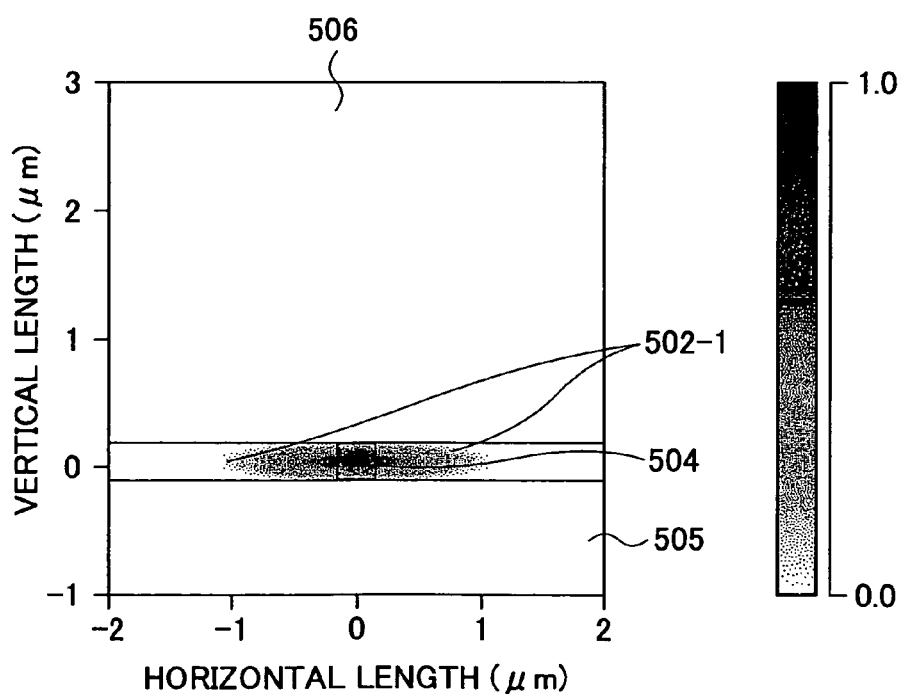
FIG. 27 shows a field intensity distribution of propagating light in a low index difference optical waveguide with the results of calculating the field intensity distribution according to the 12$^{th}$ embodiment of the present invention.

Therefore, in each of the optical waveguides shown in FIGS. 25A through 25F, the core 504 is vertically sandwiched between the substrate (cladding) 505 and the cladding 506 having the same refractive index. As a result, the electromagnetic field distribution of light that propagates in the optical waveguides is vertically symmetric with respect to the core 504. FIG. 26 shows a specific calculation of the field intensity distribution of light that propagates in the high index difference optical waveguide, and FIG. 27 shows a specific calculation of the field intensity distribution of light that propagates in the low index difference optical waveguide. In FIGS. 26 and 27, the refractive index of the substrate 505 is 1.45, and the refractive index of the core 504 is 2.17. Further, the refractive index of the cladding 506 is 1.45, which is the same as that of the substrate 505. The refractive index of the cladding 501-1 that is in contact with the side surfaces of the core 504 in the high refractive index difference optical waveguide 501 is 1.0. The refractive index of the cladding 502-1 that is in contact with the side surfaces of the core 504 in the low refractive index difference optical waveguide 502 is 2.15. By the above-described combination of refractive indices, the relative index difference in the high index difference optical waveguide 501 can be 39%, and the relative index difference in the low index difference optical waveguide 502 can be approximately 0.9%. Further, the core size of each of the optical waveguides 501 and 502 is 400×400 nm$^2$. This size is determined from the conditions for the high index difference optical waveguide operating with a single mode. Accordingly, it is clear that this size also satisfies the single mode conditions in the low index difference optical waveguide 502. According to the electromagnetic distribution shown in FIG. 26, with respect to the high index difference optical waveguide 501, since the refractive index of the core 504 is extremely high, the light is confined only in the core 504 and its vicinity, so that the electromagnetic field distribution is substantially equal to the electromagnetic field distribution of FIG. 21. On the other hand, in the low index difference optical waveguide 502, since the refractive index of the cladding 502-1 on the sides of the core 504 is high with respect to the refractive index of the substrate 505 and the cladding 506 between which the core 504 is vertically sandwiched, the electromagnetic field distribution of a propagation mode has a shape that greatly extends laterally. Further, the shape of the electric field distribution is vertically symmetric with respect to the core 504.

Figure 28:
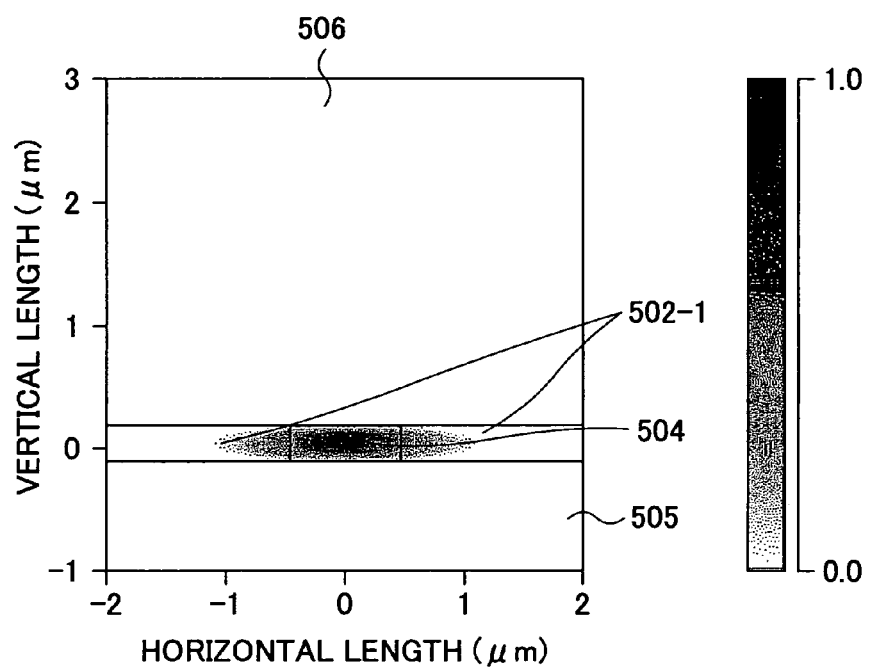
FIG. 28 shows a field intensity distribution of propagating light in a low index difference optical waveguide with the results of calculating the field intensity distribution according to the 11$^{th}$ embodiment of the present invention.

Further, FIG. 28 shows a calculation of the distribution of field intensity confined in the core 504 in the case of increasing only the width of the core 504 so that the size of the core 504 is 400×1400 nm$^2$ in the low index difference optical waveguide 502 shown in one or more of FIGS. 25A through 25F. This core width is determined from the conditions for the low index difference optical waveguide 502 operating with a single mode. Compared with the case where the core width is the same in all waveguides, light is confined strongly in the core of the low index difference optical waveguide 502 by increasing the core width. Accordingly, it is possible to reduce the difference between the electric field distribution of light that propagates in the low index difference optical waveguide and the electric field distribution of light that propagates in the high index difference optical waveguide. This is effective in reducing the taper length in the optical coupling part.

As seen from FIG. 26 and FIG. 27 or 28, in the composite optical waveguide according to this embodiment, the electric field distribution of a propagation mode is vertically symmetric in each optical waveguide, and the center of the distribution is the center of the core. This corresponds to light propagation with no vertical axial offset through the composite optical waveguide, meaning that the optical waveguides can be coupled with low loss. Further, it is possible to reduce the taper length in the optical coupling part for the same reason.

Further, in the low index difference optical waveguide, the refractive index of the cladding contacting the side surfaces of the core is high, so that the refractive index difference between the core and the cladding is extremely small. On the other hand, the claddings contacting the upper and lower surfaces of the core have a relatively low refractive index, so that the refractive index difference between the core and the claddings is large. However, this hardly affects the propagation loss of the optical waveguide. The reason for this is as follows. That is, propagation loss at the time of propagation through an optical waveguide results principally from light scattering on the side surfaces of a core. This is because roughness is more likely to be caused on the side surfaces than on the upper or lower surface of the core because of the fabrication process of the optical waveguide. Accordingly, in order to reduce propagation loss, it is effective to reduce the refractive index difference of the optical waveguide in the lateral directions. On the other hand, it is less likely that roughness that can cause scattering loss is caused to the upper and lower surfaces of the core. Therefore, there may be a refractive index difference between the core and the cladding in the vertical directions. According to one aspect of the present invention, since the high index difference optical waveguide and the low index difference optical waveguide are equal in substrate material and upper cladding material, it is preferable that the substrate and the upper cladding have a low refractive index in order to strengthen light confinement in the high index difference optical waveguide.

Figure 29:
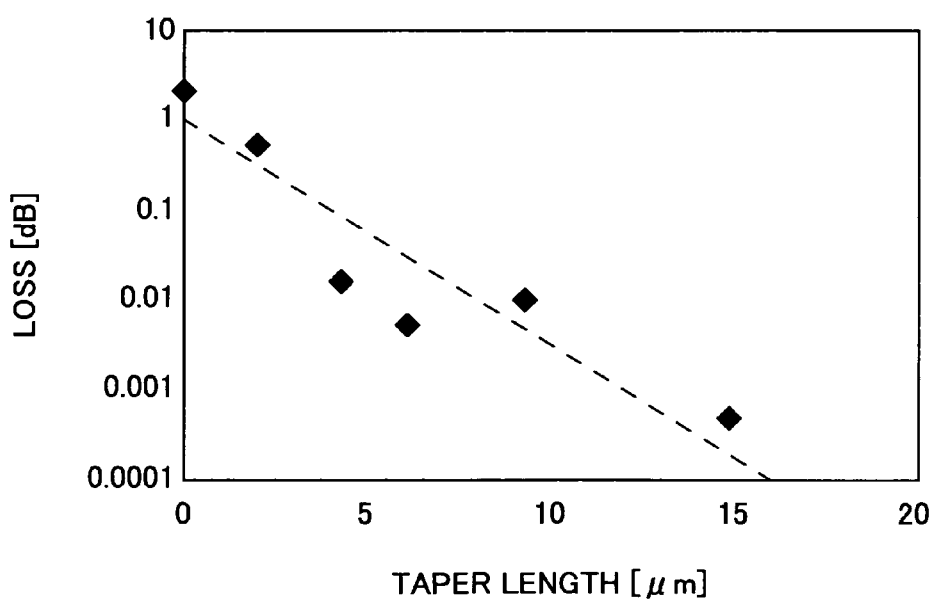
FIG. 29 is a characteristic diagram showing the calculation results of estimating changes in loss with respect to taper length in an optical coupling part according to the 12$^{th}$ embodiment of the present invention.
Figure 30:
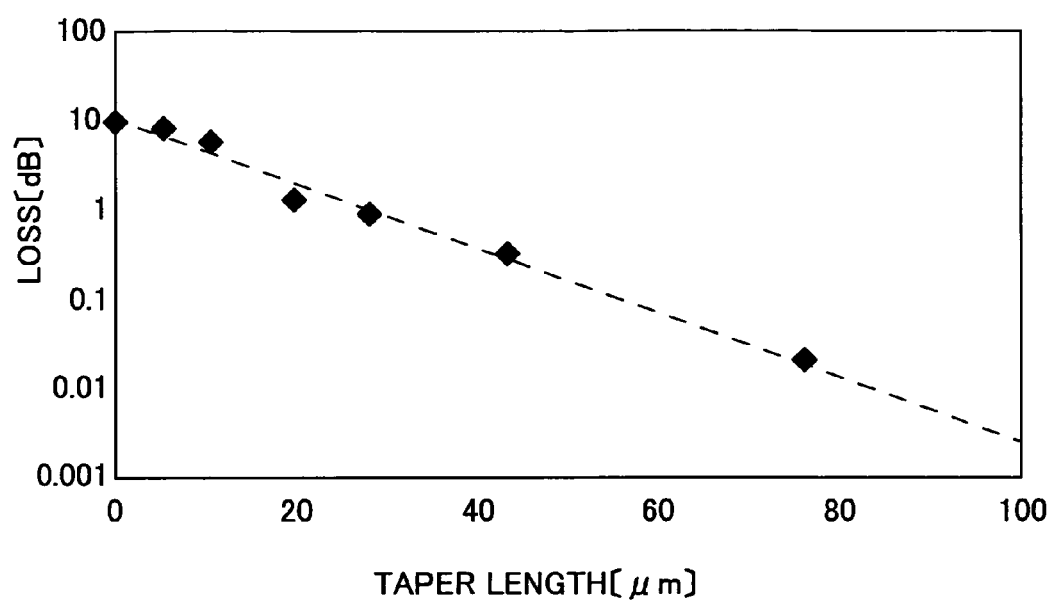
FIG. 30 is a characteristic diagram showing the calculation results of estimating changes in loss with respect to taper length in an optical coupling part using structural parameters different from those of FIG. 29 according to the 12$^{th}$ embodiment of the present invention.

Further, the effects of this embodiment are confirmed by a three-dimensional FDTD simulation. Specifically, light is propagated in a composite optical waveguide formed of a high index difference optical waveguide, an optical coupling part, and a low index difference optical waveguide, and the loss at the time of coupling the optical waveguides different in relative index difference is calculated by comparing input light power and output light power. Here, a loss value depends on the taper length in the optical coupling part. The smaller the rate of change of taper, that is, the larger the taper length, the more the loss due to coupling can be reduced. However, for miniaturization of optical integrated devices, it is preferable to make the taper length as small as possible. Therefore, changes in the loss relative to the taper length in the optical coupling part are estimated. The calculation results are shown in FIGS. 29 and 30. In the calculation shown in FIG. 29, the following structural parameters are assumed. The refractive index of the core of each optical waveguide is 2.17, and the core size is 400×400 nm² in each optical waveguide. Further, the refractive index of each of the upper cladding and the substrate is 1.45. The refractive index of the side cladding of the high index difference optical waveguide is 1.0, and the refractive index of the side cladding of the low index difference optical waveguide is 2.0. As a result, the relative index difference of the high index difference optical waveguide is 39%, and the relative index difference of the low index difference optical waveguide is 7.5%. FIG. 29 shows that it is possible to couple the optical waveguides different in relative index difference substantially without loss if the taper length is greater than or equal to 10 μm. Compared with the results of the case of FIG. 23 where the cladding width is simply changed in a tapered manner, the taper length, that is, the device length of an optical coupler, can be reduced to approximately 1/10 by vertically sandwiching the core of the optical waveguide between materials having the same refractive index.

In the calculation shown in FIG. 30, the following structural parameters are assumed. The refractive index of the core of each optical waveguide is 2.17, and the refractive index of each of the upper cladding and the substrate is 1.45. Further, the refractive index of the side cladding of the high index difference optical waveguide is 1.0, and the refractive index of the side cladding of the low index difference optical waveguide is 2.15. As a result, the relative index difference of the high index difference optical waveguide is 39%, and the relative index difference of the low index difference optical waveguide is 0.9%. The core size of the high index difference optical waveguide is 400×400 nm². On the other hand, the core thickness of the low index difference optical waveguide is 400 nm, which is the same as the core thickness of the high index difference optical waveguide, but the core width of the low index difference optical waveguide is 1.4 μm so that the low index difference optical waveguide has a wide core. FIG. 30 shows that it is possible to couple the optical waveguides substantially without loss if the taper length is approximately 80 μm.

It is known that common spot size converters require a transition length of approximately several mm in order to eliminate the mode mismatching of light, and a taper length of approximately several hundred μm to several mm is also required in the conventional structure shown in FIGS. 19A to 19F in order to connect an HIC optical waveguide and an optical fiber. On the other hand, FIGS. 29 and 30 show that the taper length can be reduced to approximately 1/10 or less by changing the cladding width in a tapered manner according to this embodiment.

Figure 31A:
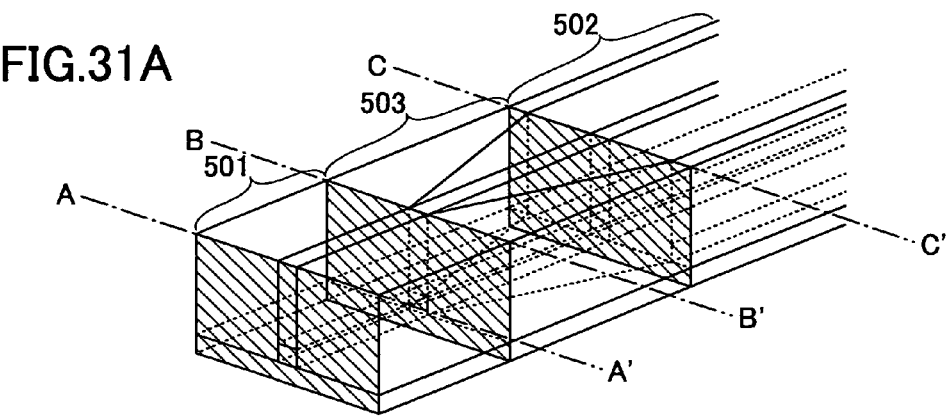
FIGS. 31A through 31F are diagrams showing an optical integrated device according a 13$^{th}$ embodiment of the present invention.
Figure 31B:
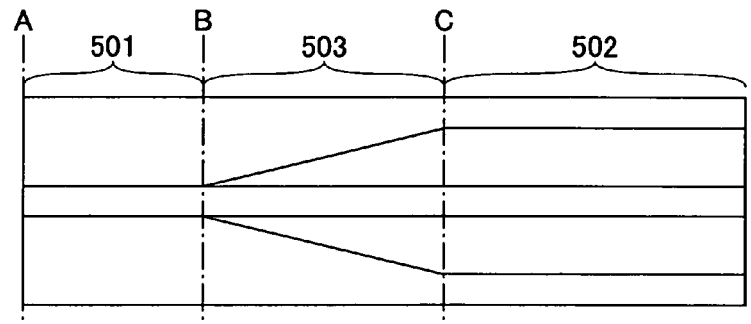
Figure 31C:
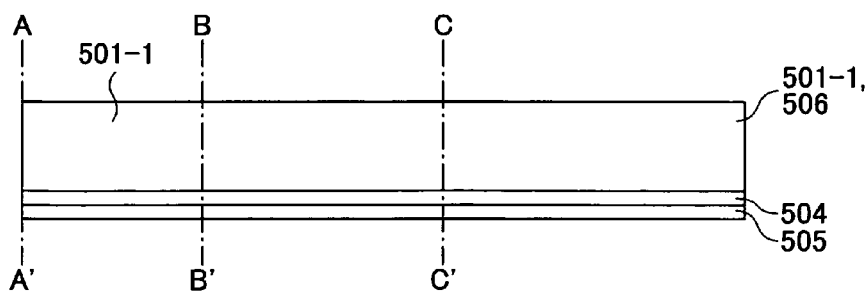
Figure 31D:
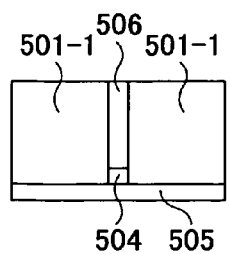
Figure 31E:
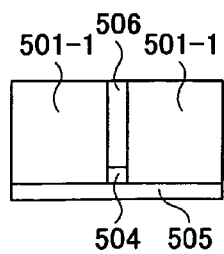
Figure 31F:
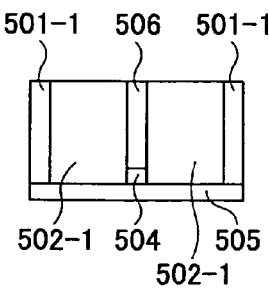

FIGS. 31A through 31F are diagrams showing an optical integrated device according a 13$^{th}$ embodiment of the present invention. FIGS. 31A through 31C are a perspective view, a plan view, and a side view, respectively, of the optical integrated device of this embodiment. FIG. 31D is a cross-sectional view taken along the line A-A' of FIGS. 31A through 31C. FIG. 31E is a cross-sectional view taken along the line B-B' of FIGS. 31A through 31C. FIG. 31F is a cross-sectional view taken along the line C-C' of FIGS. 31A through 31C. In FIGS. 31A through 31F, the same elements as those of FIGS. 20A through 20F are referred to by the same reference numerals. Each optical waveguide structure has the common core 504 on the substrate 505. In the high index difference optical waveguide 501, the cladding 506 is provided on the core 504, and both side surfaces of the core 504 are covered with the cladding 501-1. On the other hand, in the low index difference optical waveguide 502, both side surfaces of the core 504 are covered with the cladding 502-1. Here, by causing the cladding 501-1 to be lower in refractive index than the cladding 502-1, it is possible to cause the optical waveguides 501 and 502 to be different in relative index difference.

Here, the upper cladding 506 is always equal in width to the core 504. Further, although the core width is graphically represented as the same in all the optical waveguides in FIGS. 31A through 31F, it is also effective to cause the core width to be greater in the low index difference optical waveguide 502 than in the high index difference optical waveguide 501 as in the 11$^{th}$ embodiment shown in FIGS. 24A through 24F. Further, by causing the substrate 505 (FIGS. 31A through 31F) to be substantially equal in refractive index to the upper cladding 506, the core 504 is vertically sandwiched between the claddings (504 and 506) having the same refractive index. As a result, the electric field distribution of light that propagates in the optical waveguides is always symmetric vertically with respect to the center of the core 504. Further, there is no substantial difference in the distribution of its evanescent components between the high index difference optical waveguide 501 and the low index difference optical waveguide 502. Accordingly, it is only necessary to reduce the difference in electric field distribution in the lateral directions with respect to the core 504 in the optical coupling part 503. Accordingly, it is possible to couple the optical waveguides 501 and 502 with low loss even with a reduced taper length of the optical coupling part 503.

Figure 32A:
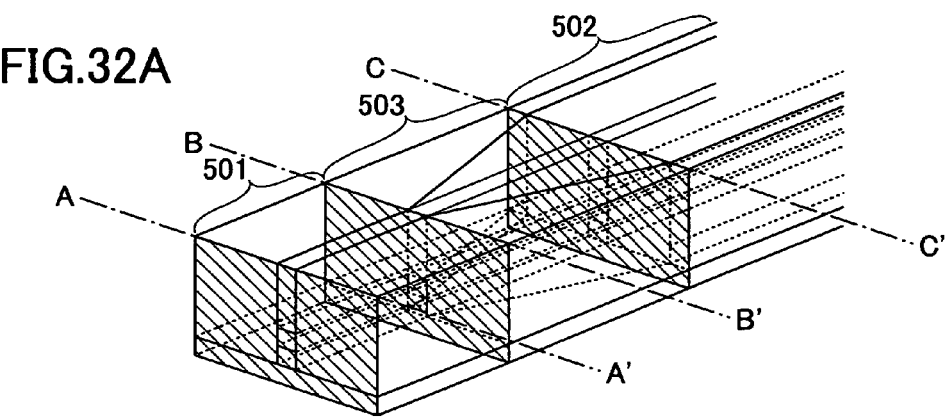
FIGS. 32A through 32F are diagrams showing an optical integrated device according a 14$^{th}$ embodiment of the present invention.
Figure 32B:
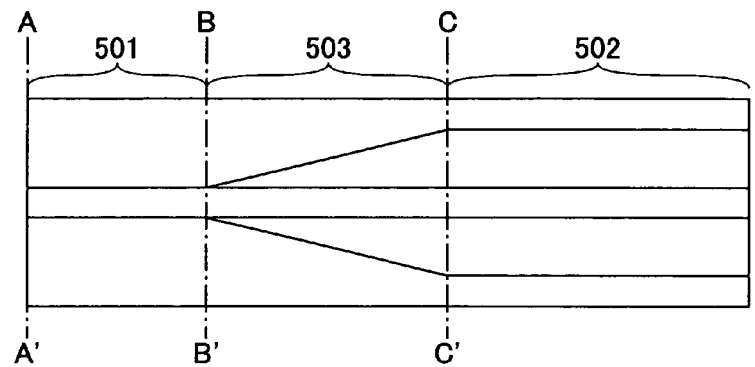
Figure 32C:
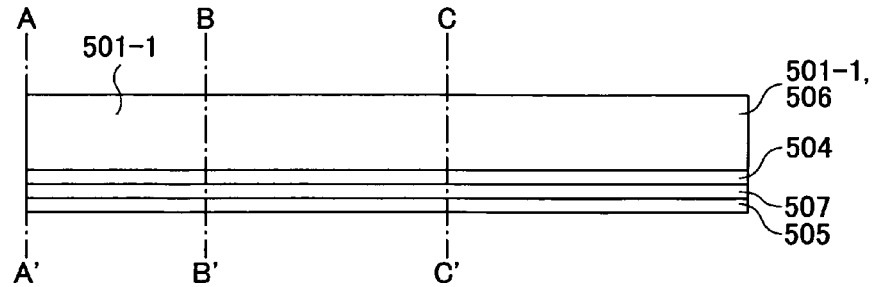
Figure 32D:
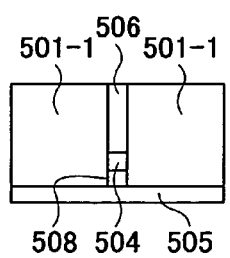
Figure 32E:
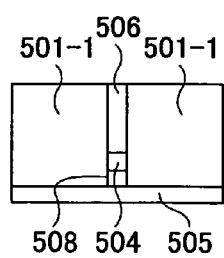
Figure 32F:
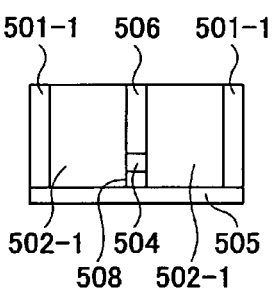

FIGS. 32A through 32F are diagrams showing an optical integrated device according a 14$^{th}$ embodiment of the present invention. FIGS. 32A through 32C are a perspective view, a plan view, and a side view, respectively, of the optical integrated device of this embodiment. FIG. 32D is a cross-sectional view taken along the line A-A' of FIGS. 32A through 32C. FIG. 32E is a cross-sectional view taken along the line B-B' of FIGS. 32A through 32C. FIG. 32F is a cross-sectional view taken along the line C-C' of FIGS. 32A through 32C. In FIGS. 32A through 32F, the same elements as those of FIGS. 31A through 31F are referred to by the same reference numerals. The optical integrated device of this embodiment shown in FIGS. 32A through 32F includes a cladding 507 sandwiched between the core 504 and the substrate 505. Here, the cladding 507 is substantially equal in width to the core 504. In this embodiment, the cladding 507 has a quadrangular cross section. Alternatively, the cladding 507 may have a ridge-shaped, that is, convex cross section.

In the above-described embodiments, it is assumed that the substrate has an extremely low refractive index compared with the core of the optical waveguide. Therefore, the types of substrates are limited to those of low refractive index materials such as quartz. However, according to the 14$^{th}$ embodiment, as a result of forming the cladding 507 having a low refractive index on the substrate 505, the types of substrates are no longer limited. That is, the substrate 505 may be formed of a semiconductor material having a high refractive index or a material that does not propagate light.

Further, in the 13$^{th}$ embodiment shown in FIGS. 31A through 31F, if the cladding 502-1 has a high refractive index in order to reduce the relative index difference of the low index difference optical waveguide 502, the difference in refractive index between the substrate 505 and the cladding 502-1 increases, so that the mode field shape of propagating light may spread widely into the cladding 502-1. In this case, the electric field shape is vertically asymmetric with respect to the core center. Accordingly, the optical coupling part 503 has a larger taper length in order to couple the optical waveguides 501 and 502 with low loss. On the other hand, according to the 14$^{th}$ embodiment, the taper length can be reduced because the electric field of a propagation mode has a vertically symmetric distribution in the cladding 502-1.

FIGS. 33A through 33F are diagrams showing an optical integrated device according a 15th embodiment of the present invention. FIGS. 33A through 33C are a perspective view, a plan view, and a side view, respectively, of the optical integrated device of this embodiment. FIG. 33D is a cross-sectional view taken along the line A-A' of FIGS. 33A through 33C. FIG. 33E is a cross-sectional view taken along the line B-B' of FIGS. 33A through 33C. FIG. 33F is a cross-sectional view taken along the line C-C' of FIGS. 33A through 33C. In FIGS. 33A through 33F, the same elements as those of FIGS. 32A through 32F are referred to by the same reference numerals. In the optical integrated device of this embodiment shown in FIGS. 33A through 33F, a buffer layer 508 is formed between the substrate 505 and the composite optical waveguide. The buffer layer 508 is formed of a dielectric thin film, a metal thin film, or layers thereof. For example, if a metal thin film is sandwiched between the substrate 505 and an optical waveguide, and a metal layer (thin film) is also formed on the optical waveguide, the optical waveguide is vertically sandwiched between the metal thin films. Here, the metal films function as electrodes, so that by applying voltage between the upper and lower metal films, an electric field is vertically formed with respect to the optical waveguide. Accordingly, if a material having the electrooptic effect is used as the core of the optical waveguide, it is possible to change the refractive index of the core by applying voltage to the metal films. By using this refractive index change, it is possible to realize, for example, an optical switch, an optical modulator, and a variable-wavelength optical multiplexer/demultiplexer.

Further, in the case of poor adhesion between the substrate 505 and the material of the core 504 or the material of the cladding 501-1 or 501-2, the above-described buffer layer 508 may be provided therebetween. Thereby, it is possible to form a composite optical waveguide without limiting the types of the substrate 505.

Figure 34:
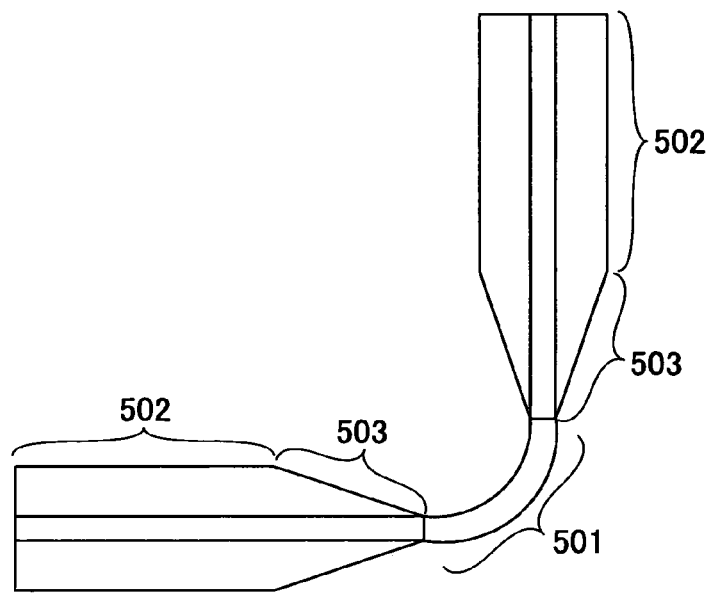
FIG. 34 is a diagram showing a composite optical waveguide according to a 15$^{th}$ embodiment of the present invention, which is realized by using an optical integrated device according to one embodiment of the present invention.

FIG. 34 is a diagram showing a composite optical waveguide according to a $15^{th}$ embodiment of the present invention, which is realized by using an optical integrated device according to one embodiment of the present invention. As shown in FIG. 34, the low index difference optical waveguides 502 are connected through the optical coupling parts 503 and the curved high index difference optical waveguide 501, so that it is possible to change the traveling direction of propagating light. The low index difference optical waveguides 502 and the high index difference optical waveguide 501 are connected with low loss through the optical coupling parts 503.

According to a composite optical waveguide according to this embodiment, an optical line part having a relatively large radius of curvature is formed of a low index difference optical waveguide, and a part that controls light with a sharply curved or bent part is formed of a high index difference optical waveguide. This makes it possible to reduce the propagation loss of light that propagates in the circuit, and to achieve high-density integration of the optical circuit. In detail, the conventional optical waveguide has a relative index difference of approximately 1% or less, and it is necessary to curve the optical waveguide with a radius of curvature of approximately millimeters in order to change the traveling direction of propagating light. On the other hand, according to one embodiment of the present invention, even if an optical waveguide has a relative index difference of approximately 1%, the optical waveguide is curved or bent with a high index difference waveguide in the case of changing the traveling direction of light, so that it is possible to reduce the radius of curvature to several μm to several tens of μm.

Figure 35:
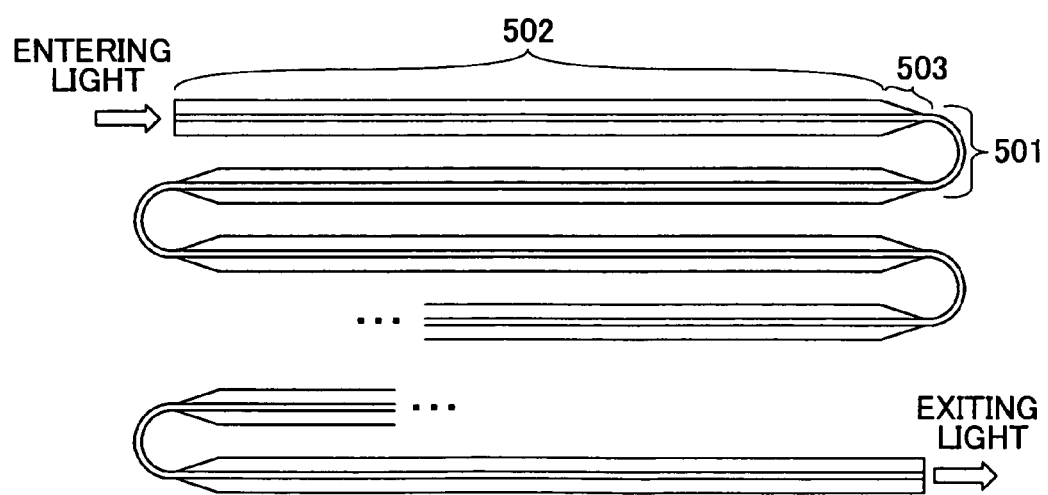
FIG. 35 is a diagram showing a high-density optical integrated circuit using the composite optical waveguide of FIG. 34 according to a 16$^{th}$ embodiment of the present invention.

FIG. 35 is a diagram showing a high-density optical integrated circuit using a composite optical waveguide according to a $16^{th}$ embodiment of the present invention. The high-density optical integrated circuit shown in FIG. 35 is an optical circuit having an optical buffer function. Conventionally, in order to realize the same function, it is necessary to propagate light in an optical fiber on the order of a meter. For example, assuming that the effective refractive index of an optical waveguide is 2.0, an optical interconnection of 15 cm in length is required in order to cause an optical delay of 1 ns. Consideration is given to loss and size in the case of realizing the optical interconnection of this length with a low index difference optical waveguide. Letting the propagation loss of the low index difference optical waveguide be 0.1 dB/cm, the loss caused by 15 cm propagation is less than or equal to 1.5 dB. However, forming a straight optical interconnection requires a device size of 15 cm. Further, making the device compact by introducing a curved structure results in a large radius of curvature of approximately 1 cm or more, thus causing an increase in device area, so that it is impossible to realize a high-density optical interconnection. On the other hand, if a curved part of a delay line is formed of a high index difference optical waveguide as in one embodiment of the present invention, it is possible to contain an optical waveguide in a chip 1 cm square because the radius of curvature is on the order of a micron in the optical waveguide. The 15 cm optical waveguide is divided into 15 optical waveguides, and the 15 optical waveguides are arranged parallel to one another so as to be coupled through high index difference optical waveguides each having a radius of curvature of several tens of μm. As a result, the area occupied by the device is approximately 10 mm×1 mm. Thus, it is possible to realize the optical buffer function with an extremely minute device size. In this optical integrated device, the propagation loss of an optical waveguide is less than or equal to 1.5 dB, and letting the connection loss of a high index difference optical waveguide and a low index difference optical waveguide be 0.1 dB per point, the connection loss is approximately 1.5 dB in total. Accordingly, it is possible to realize an optical buffer circuit of high-density integration with the total loss of 3 dB or less.

Figure 36A:
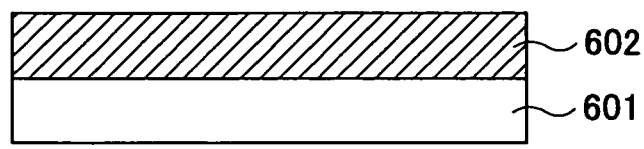
FIGS. 36A through 36F are diagrams showing a fabrication process for fabricating an optical integrated device according to one embodiment of the present invention.
Figure 36B:
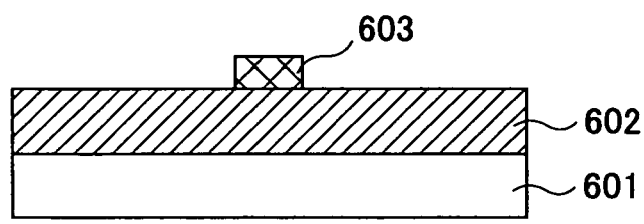
Figure 36C:
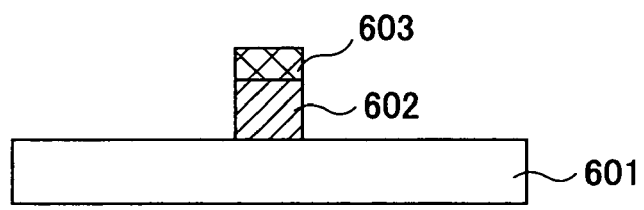
Figure 36D:
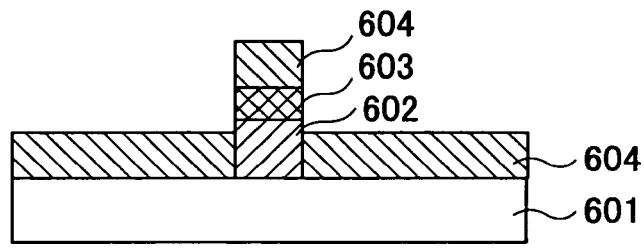
Figure 36E:
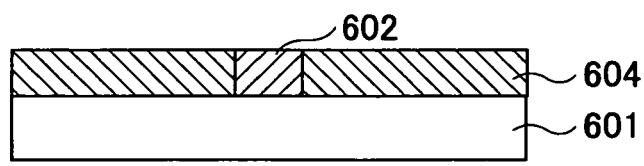
Figure 36F:
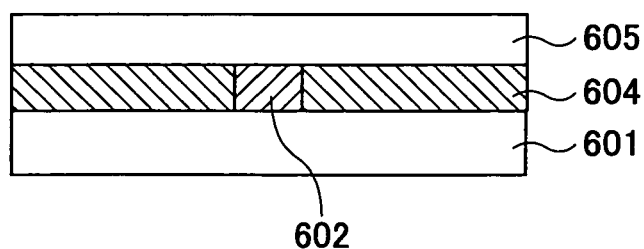

Next, FIGS. 36A through 36F are diagrams showing a fabrication process for fabricating an optical integrated device according to one embodiment of the present invention. FIGS. 36A through 36F show a process for forming a low index difference optical waveguide. First, as shown in FIG. 36A, a core material thin film 602 is formed on a substrate 601 since a high index difference optical waveguide, an optical coupling part, and a low index difference optical waveguide have the same core thickness. Then, as shown in FIGS. 36B and 36C, only the core width is controlled by the width of a mask 603, and the core layer is etched into a channel. Thereafter, as shown in FIG. 36D, a cladding material 604 to fill in the side spaces of the low refractive index difference optical waveguide is formed to be as thick as a core. Next, as shown in FIG. 36E, the cladding material 604 deposited on the core is removed by lift-off processing, thereby flattening the upper surface of the core. Instead of the lift-off processing, polishing may be performed. Finally, as shown in FIG. 36F, a film of a cladding material 605 is formed so as to cover the upper surface of the core. By the above-described fabrication process, a low index difference optical waveguide can be formed. In order to fabricate a composite optical waveguide, patterning is further performed on the low index difference optical waveguide, and the side cladding material 604 is removed and replaced by the cladding material of a high index difference optical waveguide.

A photolithography technique employed in an ordinary semiconductor process may be used in the patterning. Further, in the etching, a dry etching process such as reactive ion etching (RIE) is effective. Further, it is also possible to remove the cladding material 604 on the core and flatten the upper surface of the optical waveguide by peeling off the mask 603 by wet etching after embedding the cladding material 604 without removing the mask 603 used for the patterning.

Figure 37A:
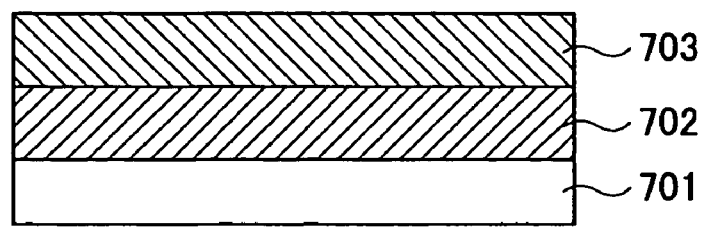
FIGS. 37A through 37D are diagrams showing a process for fabricating the optical integrated device of the 13$^{th}$ embodiment of the present invention.
Figure 37B:
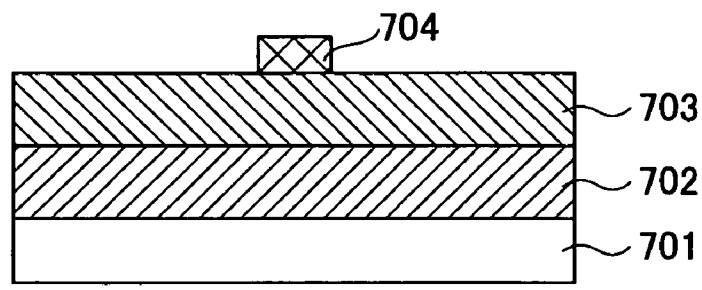
Figure 37C:
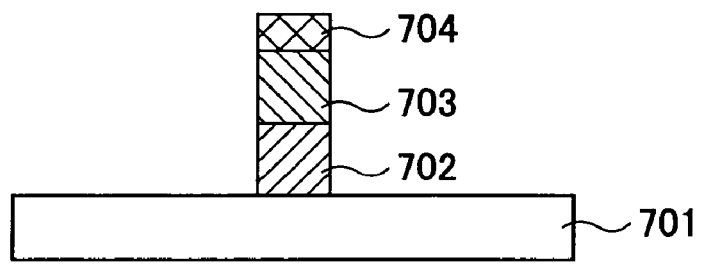
Figure 37D:
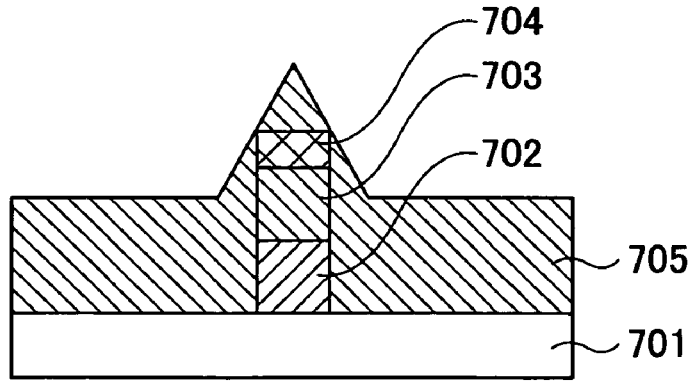

Next, FIGS. 37A through 37D are diagrams showing a process for fabricating the optical integrated device of the 13$^{th}$ embodiment (FIGS. 31A through 31F). First, as shown in FIG. 37A, a core material thin film 702 to serve as a core layer is formed on a substrate 701, and a cladding material 703 to serve as an upper cladding is formed on the core material thin film 702. Thereafter, as shown in FIG. 37B, a patterning mask 704 is provided on the upper cladding material 703. Then, as shown in FIG. 37C, etching is performed to the core layer, converting the core into a channel. Finally, as shown in FIG. 37D, a film of a cladding material 705 to serve as the side cladding of a low index difference optical waveguide is formed. Further, in the case of forming a high index difference optical waveguide, although not graphically illustrated, the upper surface is flattened by lift-off processing or polishing, and patterning and etching are repeated. Thus, the cladding of the low index difference optical waveguide has a greater thickness than the core. Accordingly, there is no need to perform highly accurate film thickness control in fabricating a composite optical waveguide, thus facilitating its fabrication.

According to one embodiment of the present invention, there is provided a first optical integrated device having multiple optical waveguides connected on the same substrate and each including a core and a cladding, wherein adjacent two of the optical waveguides are different in a refractive index difference between the core and the cladding.

Accordingly, it is possible to provide an easily fabricable, low-loss optical integrated device in which optical waveguides disposed on the same substrate are integrated with high density.

According to one embodiment of the present invention, there is provided a second optical integrated device having multiple optical waveguides connected on the same substrate and each including a core and a cladding, wherein: a first one of adjacent three of the optical waveguides and a second one of the adjacent three of the optical waveguides are equal in the refractive index difference between the core and the cladding; and a third one of the adjacent three of the optical waveguides sandwiched between the first one and the second one thereof is different in the refractive index difference between the core and the cladding from the first one and the second one.

Accordingly, it is possible to provide an easily fabricable, low-loss optical integrated device in which optical waveguides disposed on the same substrate are integrated with high density.

Additionally, in the first optical integrated device, the cores of the adjacent two of the optical waveguides may have the same refractive index.

Additionally, the optical waveguides may include multiple first optical waveguides and multiple second optical waveguides, the first optical waveguides being linear and having a smaller relative index difference than the second optical waveguides, the first optical waveguides being coupled by the second optical waveguides.

Accordingly, it is possible to provide a low-loss optical integrated device.

Additionally, in the first optical integrated device, a first one of the adjacent two of the optical waveguides may have a greater relative index difference than a second one of the adjacent two of the optical waveguides; and the first one of the adjacent two of the optical waveguides may have a curved part having a smaller radius of curvature than the second one of the adjacent two of the optical waveguides.

Accordingly, it is possible to provide an optical integrated device that can realize an extremely minute, low-loss ring resonator.

Additionally, in the first optical integrated device, a first one of the adjacent two of the optical waveguides may have a greater relative index difference than a second one of the adjacent two of the optical waveguides; the cladding of the second one of the adjacent two of the optical waveguides may include a first cladding part and a second cladding part between which the core is sandwiched; and the refractive index of a material forming the second one of the adjacent two of the optical waveguides may be controlled by applying voltage between the first cladding part and the second cladding part.

Additionally, in the first optical integrated device, a first one of the adjacent two of the optical waveguides may have a greater relative index difference than a second one of the adjacent two of the optical waveguides; the cladding of the first one of the adjacent two of the optical waveguides may include a first cladding part and a second cladding part between which the core is sandwiched; and the refractive index of a material forming the first one of the adjacent two of the optical waveguides may be controlled by applying voltage between the first cladding part and the second cladding part.

Additionally, in the first optical integrated device, the optical waveguides may include one of an electrooptic material and a semiconductor material.

Accordingly, it is possible to perform high-speed refractive index modulation, so that it is possible to apply an optical integrated device to an optical switching device.

The above-described features and effects may also be applied to the second optical integrated device.

According to one embodiment of the present invention, there is provided a third optical integrated device having multiple optical waveguides connected on the same substrate and each including a core and a cladding, the optical integrated device including an optical coupling part configured to couple adjacent two of the optical waveguides different in the refractive index difference between the core and the cladding, the optical coupling part including an optical waveguide having a core and a cladding.

Accordingly, it is possible to provide an optical integrated device that couples optical waveguides having different relative index differences with low loss and includes an easily fabricable optical coupling part.

Additionally, in the third optical integrated device, the cladding of the optical coupling part may include at least two types of cladding materials.

Additionally, in the third optical integrated device, a first one of the adjacent two of the optical waveguides may have a greater relative index difference than a second one of the adjacent two of the optical waveguides; a first one of the cladding materials forming the cladding of the optical coupling part may be equal to a cladding material forming the cladding of the first one of the adjacent two of the optical waveguides; and a second one of the cladding materials forming the cladding of the optical coupling part may be equal to a cladding material forming the cladding of the second one of the adjacent two of the optical waveguides.

Additionally, the optical coupling part may include a cladding layer formed of the second cladding material; and the width of the cladding layer may be reduced toward the first one of the adjacent two of the optical waveguides from the second one of the adjacent two of the optical waveguides.

Accordingly, it is possible to provide an optical integrated device that couples optical waveguides having different relative index differences with low loss and includes an easily fabricable optical coupling part.

Additionally, in the third optical integrated device, the cores of the first one and the second one of the adjacent two of the optical waveguides and the core of the optical coupling part may have the same refractive index.

Additionally, in the third optical integrated device, the cores of the first one and the second one of the adjacent two of the optical waveguides and the core of the optical coupling part may have the same cross-sectional shape.

Additionally, in the third optical integrated device, the cores of the first one and the second one of the adjacent two of the optical waveguides and the core of the optical coupling part may have the same cross-sectional size.

Additionally, in the third optical integrated device, the core of the second one of the adjacent two of the optical waveguides may have a greater width than the core of the first one of the adjacent two of the optical waveguides; the optical coupling part may be coupled to the first one and the second one of the adjacent two of the optical waveguides at a first end and a second end, respectively, of the optical coupling part, and the core of the optical coupling part is equal in width to the core of the first one of the adjacent two of the optical waveguides at the first end of the optical coupling part and to the core of the second one of the adjacent two of the optical waveguides at the second end of the optical coupling part; and the width of the core of the optical coupling part may be reduced toward the first one of the adjacent two of the optical waveguides from the second one of the adjacent two of the optical waveguides.

Accordingly, it is possible to reduce propagation length for which light propagates in the optical coupling part.

Additionally, the third optical integrated may further include a cladding layer formed of a third cladding material provided on each of the cores of the first one and the second one of the adjacent two of the optical waveguides and the optical coupling part, the cladding layers having the same refractive index.

Additionally, the refractive index of the cladding layers of the third material may be equal to a refractive index of the substrate.

Additionally, the cladding layer of the third material may be equal in width to the core in each of the first one and the second one of the adjacent two of the optical waveguides and the optical coupling part.

Accordingly, it is possible to couple optical waveguides having different relative index differences with low loss.

Additionally, a cladding layer formed of a fourth cladding material may be provided between the substrate and each of the cores of the first one and the second one of the adjacent two of the optical waveguides and the optical coupling part, the cladding layers having the same refractive index.

Additionally, the refractive index of the cladding layers of the third material may be equal to the refractive index of the cladding layers of the fourth material.

Additionally, the cladding layer of the fourth material may be equal in width to the core in each of the first one and the second one of the adjacent two of the optical waveguides and the optical coupling part.

Accordingly, it is possible to provide an optical integrated device that couples optical waveguides having different relative index differences with low loss and includes an easily fabricable optical coupling part without limiting types of substrates.

Additionally, the third optical integrated device may further include a buffer layer formed of one of a dielectric thin film, a metal thin film, and a combination thereof, the buffer layer being provided on at least one of a first surface and a second surface of the substrate, the first surface facing away from the second surface.

Accordingly, it is possible to change the refractive index of the material of an optical waveguide and the optical waveguide material of an optical coupling part.

According to one embodiment of the present invention, there is provided a first optical control device having an optical input part, an optical coupling part, an optical output part, and an optical separation part, each of which includes any of the above-described first through third optical integrated devices, wherein the optical separation part includes a first optical waveguide, and each of the optical input part, the optical coupling part, and the optical output part includes a second optical waveguide, the first optical waveguide having a greater relative index difference than the second optical waveguide.

Accordingly, it is possible to miniaturize a device in size.

According to one embodiment of the present invention, there is provided a second optical control device having an optical input part, an optical coupling part, and an optical output part, each of which includes any of the above-described first through third optical integrated devices, wherein each of the optical input part and the optical output part includes a first optical waveguide, and the optical coupling part includes a second optical waveguide, the first optical waveguide having a greater relative index difference than the second optical waveguide.

Accordingly, it is possible to integrate an optical separation part, so that a device can be reduced in size.

According to one embodiment of the present invention, there is provided a third optical control device having two linear optical waveguides each having an optical input part, an optical coupling part, and an optical output part; and two curved optical waveguides having a ring shape, the two linear optical waveguides and the two curved optical waveguides each including any of the above-described first through third optical integrated devices, wherein the optical coupling parts of the two linear optical waveguides are connected through the two curved optical waveguides; each of the two curved optical waveguides includes a first optical waveguide, and each of the optical input parts, the optical coupling parts, and the optical output parts includes a second optical waveguide, the first optical waveguide having a greater relative index difference than the second optical waveguide.

Accordingly, it is possible to reduce the optical path length of a resonator, and to reduce optical loss.

Additionally, in any of the above-described first through third optical control devices, a first cladding on a first side of a core and a second cladding on a second side of the core in the first optical waveguide may include a same material; the first optical waveguide may have a first width of the core and the second optical waveguide may have a second width of the core greater than the first width of the core; and the core may be reduced in width from the first width toward the second optical waveguide in an optical connection part configured to connect the first optical waveguide and the second optical waveguide.

Accordingly, it is possible to realize low loss in optical coupling.

Additionally, in any of the above-described first through third optical control devices, a first cladding on a first side of a core and a second cladding on a second side of the core in the first optical waveguide may include a same material; the first optical waveguide may have a first width of the core and the second optical waveguide may have a second width of the core greater than the first width of the core; and the core may be reduced in width from the second width and a cladding may be reduced in width from a width in the second optical waveguide toward the first optical waveguide in an optical connection part configured to connect the first optical waveguide and the second optical waveguide.

Accordingly, it is possible to realize low loss in optical coupling.

Additionally, in any of the above-described first through third optical control devices, a first cladding on a first side of a core and a second cladding on a second side of the core in the first optical waveguide may include a same material; the first optical waveguide and the second optical waveguide are equal in width of the core; and a cladding may be reduced in width from a width in the second optical waveguide toward the first optical waveguide in an optical connection part configured to connect the first optical waveguide and the second optical waveguide.

Accordingly, it is possible to realize low loss in optical coupling.

Additionally, in any of the above-described first through third optical control devices, a first cladding on a first side of a core and a second cladding on a second side of the core in the first optical waveguide may include a same material; the first optical waveguide may have a first width of the core and the second optical waveguide may have a second width of the core greater than the first width of the core; the core may be reduced in width from the second width and a cladding may be reduced in width from a width in the second optical waveguide toward the first optical waveguide in an optical connection part configured to connect the first optical waveguide and the second optical waveguide; and the core is discontinuous in a direction in which light propagates in the optical connection part.

Accordingly, it is possible to realize low loss in optical coupling.

Additionally, the first cladding and the second cladding on the first side and the second side of the core in the first optical waveguide may include air.

Additionally, in any of the above-described first through third optical control devices, a refractive index of a material forming the second optical waveguide may be controlled by applying voltage between a first cladding on a first side of a core and a second cladding on a second side of the core in the second optical waveguide.

Accordingly, it is possible to change a wavelength that resonates in a resonator.

Additionally, in any of the above-described first through third optical control devices, a refractive index of a material forming the first optical waveguide may be controlled by applying voltage between a first cladding on a first side of a core and a second cladding on a second side of the core in the first optical waveguide.

Accordingly, it is possible to change a wavelength that resonates in a resonator.

Additionally, in any of the above-described first through third optical control devices, the first and second optical waveguides may include one of an electrooptic material and a semiconductor material.

Accordingly, it is possible to perform high-speed refractive index modulation, so that it is possible to apply an optical control device to an optical switching device.

The present invention is not limited to the specifically disclosed embodiments, and variations and modifications may be made without departing from the scope of the present invention.

The present application is based on Japanese Priority Patent Applications No. 2005-233491, filed on Aug. 11, 2005 and No. 2006-122176, filed on Apr. 26, 2006, the entire contents of which are hereby incorporated by reference.

What is claimed is:

1. An optical integrated device having a plurality of optical waveguides connected on a same substrate and each including a core and a cladding,
    wherein two adjacent optical waveguides are different in a refractive index difference between the core and the cladding;
    wherein the cores of the two adjacent optical waveguides have a same refractive index;
    wherein a first one of the two adjacent optical waveguides has a greater relative index difference than a second one of the two adjacent optical waveguides; and
    wherein the first one of the two adjacent optical waveguides has a curved part having a smaller radius of curvature than the second one of the two adjacent optical waveguides.

2. An optical integrated device having a plurality of optical waveguides connected on a same substrate and each including a core and a cladding,
    wherein two adjacent optical waveguides are different in a refractive index difference between the core and the cladding;
    wherein the cores of the two adjacent optical waveguides have a same refractive index;
    wherein a first one of the two adjacent optical waveguides has a greater relative index difference than a second one of the two adjacent optical waveguides;
    wherein the cladding of the second one of the two adjacent optical waveguides includes a first cladding part and a second cladding part between which the core is sandwiched; and
    wherein a refractive index of a material forming the second one of the two adjacent optical waveguides is controlled by applying voltage between the first cladding part and the second cladding part.

3. An optical integrated device having a plurality of optical waveguides connected on a same substrate and each including a core and a cladding,
    wherein two adjacent optical waveguides are different in a refractive index difference between the core and the cladding;
    wherein the cores of the two adjacent optical waveguides have a same refractive index;
    wherein a first one of the two adjacent optical waveguides has a greater relative index difference than a second one of the two adjacent optical waveguides;
    wherein the cladding of the first one of the two adjacent optical waveguides includes a first cladding part and a second cladding part between which the core is sandwiched; and wherein a refractive index of a material forming the first one of the two adjacent optical waveguides is controlled by applying voltage between the first cladding part and the second cladding part.

4. An optical integrated device having a plurality of optical waveguides connected on a same substrate and each including a core and a cladding, wherein:
- a first one of three adjacent optical waveguides and a second one of the three adjacent optical waveguides are equal in a refractive index difference between the core and the cladding;
- a third one of the three adjacent optical waveguides sandwiched between the first one and the second one thereof is different in the refractive index difference between the core and the cladding from the first one and the second one; and
- wherein the cores of the three adjacent optical waveguides have a same refractive index.

5. An optical integrated device having a plurality of optical waveguides connected on a same substrate and each including a core and a cladding, the optical integrated device comprising:
- an optical coupling part configured to couple two adjacent optical waveguides different in a refractive index difference between the core and the cladding, the optical coupling part including an optical waveguide having a core and a cladding wherein:
- the cladding of the optical coupling part comprises at least two types of cladding materials;
- a first one of the two adjacent optical waveguides has a greater relative index difference than a second one of the two adjacent optical waveguides;
- a first one of the cladding materials forming the cladding of the optical coupling part is equal to a cladding material forming the cladding of the first one of the two adjacent optical waveguides; and
- a second one of the cladding materials forming the cladding of the optical coupling part is equal to a cladding material forming the cladding of the second one of the two adjacent optical waveguides.

6. The optical integrated device as claimed in claim 5, wherein the optical coupling part comprises a cladding layer formed of the second cladding material; and
- a width of the cladding layer is reduced toward the first one of the two adjacent optical waveguides from the second one of the two adjacent optical waveguides.

7. The optical integrated device as claimed in claim 5, wherein the cores of the first one and the second one of the two adjacent optical waveguides and the core of the optical coupling part have a same cross-sectional shape.

8. The optical integrated device as claimed in claim 5, wherein the cores of the first one and the second one of the two adjacent optical waveguides and the core of the optical coupling part have a same cross-sectional size.

9. An optical integrated device having a plurality of optical waveguides connected on a same substrate and each including a core and a cladding, the optical integrated device comprising:
- an optical coupling part configured to couple two adjacent optical waveguides different in a refractive index difference between the core and the cladding, the optical coupling part including an optical waveguide having a core and a cladding,
- wherein the cores of the first one and the second one of the two adjacent optical waveguides and the core of the optical coupling part have a same refractive index.

10. An optical integrated device having a plurality of optical waveguides connected on a same substrate and each including a core and a cladding, the optical integrated device comprising:
- an optical coupling part configured to couple two adjacent optical waveguides different in a refractive index difference between the core and the cladding, the optical coupling part including an optical waveguide having a core and a cladding, wherein:
- the core of the second one of the two adjacent optical waveguides has a greater width than the core of the first one of the two adjacent optical waveguides;
- the optical coupling part is coupled to the first one and the second one of the two adjacent optical waveguides at a first end and a second end, respectively, of the optical coupling part, and the core of the optical coupling part is equal in width to the core of the first one of the two adjacent optical waveguides at the first end of the optical coupling part and to the core of the second one of the two adjacent optical waveguides at the second end of the optical coupling part; and
- a width of the core of the optical coupling part is reduced toward the first one of the two adjacent optical waveguides from the second one of the two adjacent optical waveguides.

11. An optical integrated device having a plurality of optical waveguides connected on a same substrate and each including a core and a cladding, the optical integrated device comprising:
- an optical coupling part configured to couple two adjacent optical waveguides different in a refractive index difference between the core and the cladding, the optical coupling part including an optical waveguide having a core and a cladding; and
- a cladding layer provided on each of the cores of the first one and the second one of the two adjacent optical waveguides and the optical coupling part, the cladding layers having a same refractive index,
- wherein the cladding layer is equal in width to the core in each of the first one and the second one of the two adjacent optical waveguides and the optical coupling part.

12. The optical integrated device as claimed in claim 11, wherein the refractive index of the cladding layers is equal to a refractive index of the substrate.

13. An optical integrated device having a plurality of optical waveguides connected on a same substrate and each including a core and a cladding, the optical integrated device comprising:
- an optical coupling part configured to couple two adjacent optical waveguides different in a refractive index difference between the core and the cladding, the optical coupling part including an optical waveguide having a core and a cladding; and
- a buffer layer formed of one of a dielectric thin film, a metal thin film, and a combination thereof, the buffer layer being provided on at least one of a first surface and a second surface of the substrate, the first surface facing away from the second surface.

* * * * *